(12) United States Patent
Sasaki et al.

(10) Patent No.: US 11,983,642 B2
(45) Date of Patent: May 14, 2024

(54) POLICY IMPROVEMENT METHOD, POLICY IMPROVEMENT PROGRAM STORAGE MEDIUM, AND POLICY IMPROVEMENT DEVICE

(71) Applicant: FUJITSU LIMITED, Kawasaki (JP)

(72) Inventors: Tomotake Sasaki, Kawasaki (JP); Hidenao Iwane, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 947 days.

(21) Appl. No.: 16/989,899

(22) Filed: Aug. 11, 2020

(65) Prior Publication Data

US 2021/0049486 A1 Feb. 18, 2021

(30) Foreign Application Priority Data

Aug. 13, 2019 (JP) ................................ 2019-148638

(51) Int. Cl.
*G06N 5/04* (2023.01)
*G06N 20/00* (2019.01)

(52) U.S. Cl.
CPC ............... *G06N 5/04* (2013.01); *G06N 20/00* (2019.01)

(58) Field of Classification Search
CPC ........... G06N 5/04; G06N 20/00; G06N 3/006
See application file for complete search history.

(56) References Cited

U.S. PATENT DOCUMENTS

| | | | | |
|---|---|---|---|---|
| 2013/0318023 A1* | 11/2013 | Morimura | ............. | G06N 20/00 706/46 |
| 2018/0225113 A1* | 8/2018 | Hasegawa | ................ | B25J 9/163 |
| 2019/0086876 A1 | 3/2019 | Sasaki et al. | | |
| 2019/0228309 A1* | 7/2019 | Yu | ........................ | G05B 13/048 |
| 2019/0354885 A1* | 11/2019 | Li | ............................ | G06N 3/04 |
| 2019/0378020 A1* | 12/2019 | Camilus | .................. | G06F 30/13 |
| 2020/0156246 A1* | 5/2020 | Srivastav | ............... | G06V 10/82 |
| 2020/0234197 A1* | 7/2020 | Osogami | .................. | G06N 3/08 |

(Continued)

FOREIGN PATENT DOCUMENTS

| CN | 107609637 A | 1/2018 |
|---|---|---|
| JP | 2009-289199 A | 12/2009 |
| JP | 2011-022902 A | 2/2011 |

(Continued)

OTHER PUBLICATIONS

Kolter et al., Regularization and Feature Selection in Least-Squares Temporal Difference Learning, 2009, 10 pages (Year: 2009).*

(Continued)

*Primary Examiner* — Marc S Somers
*Assistant Examiner* — Tri T Nguyen
(74) *Attorney, Agent, or Firm* — XSENSUS LLP

(57) ABSTRACT

A policy improvement method of improving a policy of reinforcement learning based on a state value function is performed by a computer. The method causes a computer to execute a process including: calculating an input to a control target based on the policy and a predetermined exploration method of exploring for an input to the control target in the reinforcement learning; and updating a parameter of the policy based on a result of applying the calculated input to the control target, using the input to the control target and a generalized inverse matrix regarding a state of the control target.

20 Claims, 12 Drawing Sheets

(56) References Cited

U.S. PATENT DOCUMENTS

2020/0285209 A1* 9/2020 Chakrabarty ........... G06F 17/16

FOREIGN PATENT DOCUMENTS

| | | |
|---|---|---|
| JP | 5968259 B2 * | 4/2013 |
| JP | 2014-052929 A | 3/2014 |
| JP | 2019-053593 A | 4/2019 |

OTHER PUBLICATIONS

Doya et al., Reinforcement Learning In Continuous Time and Space, 2000, 29 pages (Year: 2000).*

Lehnert et al., Successor Features Support Model-based and Model-free Reinforcement Learning, Jan. 2019, 32 pages (Year: 2019).*

Japanese Office Action dated Apr. 4, 2023, in corresponding Japanese Patent Application No. 2019-148638, 6pp.

Ben-Israel, A. and Greville, T. N. E., "Generalized inverses: theory and applications," vol. 15, Springer Science & Business Media, 2003, 2 pages.

Bernstein, D. S., "Matrix mathematics: theory, facts, and formulas," Princeton University Press, 2009, 2 pages.

Bradtke, S. J., et al., "Adaptive linear quadratic control using policy iteration," Proceedings of the American Control Conference, FP12-4:40, Baltimore, Maryland, USA, Jun. 1994, pp. 3475-3479.

Dann, C., et al., "Policy Evaluation with Temporal Differences: A Survey and Comparison," Journal of Machine Learning Research, vol. 15, 2014, pp. 809-883.

Sasaki, T., et al., "Policy Gradient Reinforcement Learning Method for Discrete-Time Linear Quadratic Regulation Problem Using Estimated State Value Function," Proceedings of the SICE Annual Conference 2017, Kanazawa University, Kanazawa, Japan, Sep. 19-22, 2017, pp. 653-657.

Yanai, H., et al., "Projection Matrices, Generalized Inverse Matrices, and Singular Value Decomposition," Springer, New York, 2011, 2 pages.

Zhu, Y. and Li, X. R., "Recursive Least Squares With Linear Constraints," Communications in Information and Systems, vol. 7, No. 3, 2007, pp. 287-312.

\* cited by examiner

FIG. 4

| TIME | STATE | INPUT | COST |
|---|---|---|---|
| t | $x_t$ | $u_t$ | $c_t$ |
| t+1 | $x_{t+1}$ | $u_{t+1}$ | $c_{t+1}$ |
| t+2 | $x_{t+2}$ | $u_{t+2}$ | $c_{t+2}$ |
| ... | ... | ... | ... |
| t+$N_e$ | $x_{t+N_e}$ | $u_{t+N_e}$ | $c_{t+N_e}$ |

FIG. 7

| METHOD | Bradtke FIRST CONTROL METHOD | POLICY GRADIENT SECOND CONTROL METHOD | POLICY IMPROVEMENT DEVICE BATCH FORMAT | POLICY IMPROVEMENT DEVICE SEQUENTIAL FORMAT |
|---|---|---|---|---|
| POLICY EVALUATION TARGET | ACTION VALUE FUNCTION | STATE VALUE FUNCTION | STATE VALUE FUNCTION | STATE VALUE FUNCTION |
| NUMBER OF INPUT DECISIONS FOR POLICY EVALUATION | $N_e$ | $N'_e$ | $N'_e$ | 1 |
| NUMBER OF INPUT DECISIONS FOR POLICY UPDATE | 0 | $mnN_i$ | $N_i^{(ac)}$ | |
| EXPLORATION | DURING POLICY EVALUATION | DURING POLICY IMPROVEMENT | DURING POLICY IMPROVEMENT | |

POLICY IMPROVEMENT METHOD, POLICY IMPROVEMENT PROGRAM STORAGE MEDIUM, AND POLICY IMPROVEMENT DEVICE

CROSS-REFERENCE TO RELATED APPLICATION

This application is based upon and claims the benefit of priority of the prior Japanese Patent Application No. 2019-148638, filed on Aug. 13, 2019, the entire contents of which are incorporated herein by reference.

FIELD

The embodiments discussed herein are related to a policy improvement method, a policy improvement program storage medium, and a policy improvement device.

BACKGROUND

There is traditionally a technique of reinforcement learning which improves a value function indicating a cumulative cost or cumulative reward based on an immediate cost or immediate reward that occurs according to an input to the control target, and improves a policy so that the cumulative cost or cumulative reward is optimized. The value function is, for example, a state-action value function (Q function) or a state value function (V function). The policy improvement corresponds, for example, to updating a policy parameter.

There is an example prior art which applies an input to a control target, observes the state of the control target, estimates the partial derivative of the logarithm of the stationary distribution from the observation result, and updates the policy parameter based on the estimated result (Japanese Laid-open Patent Publication No. 2009-289199). There is, for example, a technique for performing reinforcement learning of a policy in order to determine transaction conditions from the remaining power storage so that a reward value including a transaction balance is maximized (Japanese Laid-open Patent Publication No. 2011-22902). There is, for example, a technique of continuously outputting the current first operation signal being outputted to a thermal power plant when the current state of the thermal power plant is the state at the time of generating a second operation signal having reached the recorded state where the characteristic of the thermal power plant is determined to have deteriorated (Japanese Laid-open Patent Publication No. 2014-52929).

SUMMARY

According to an aspect of the embodiments, a policy improvement method of improving a policy of reinforcement learning based on a state value function, the policy improvement method causing a computer to execute a process including: calculating an input to a control target based on the policy and a predetermined exploration method of exploring for an input to the control target in the reinforcement learning; and updating a parameter of the policy based on a result of applying the calculated input to the control target, using the input to the control target and a generalized inverse matrix regarding a state of the control target.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is an explanatory diagram illustrating an example of the stored contents of a policy evaluation table;

FIG. 7 is an explanatory diagram illustrating an example in which the numbers of input decisions are compared;

DESCRIPTION OF EMBODIMENTS

In the technique of the related art, there is a problem that the number of input decisions in the process of updating the policy parameter increases and the processing load increases. For example, it is conceivable to update the parameter based on the result of selecting parameter components one by one and, with a perturbation added only to the selected component, performing input decisions multiple times, but the number of input decisions increases as the number of parameter components increases.

In one aspect, the disclosure aims to reduce the number of input decisions for updating a parameter.

Hereinafter, embodiments of a policy improvement method, a policy improvement program, and a policy improvement device according to the disclosure are described in detail with reference to the drawings.

(Example of Policy Improvement Method According to Embodiment)

Figure 1:
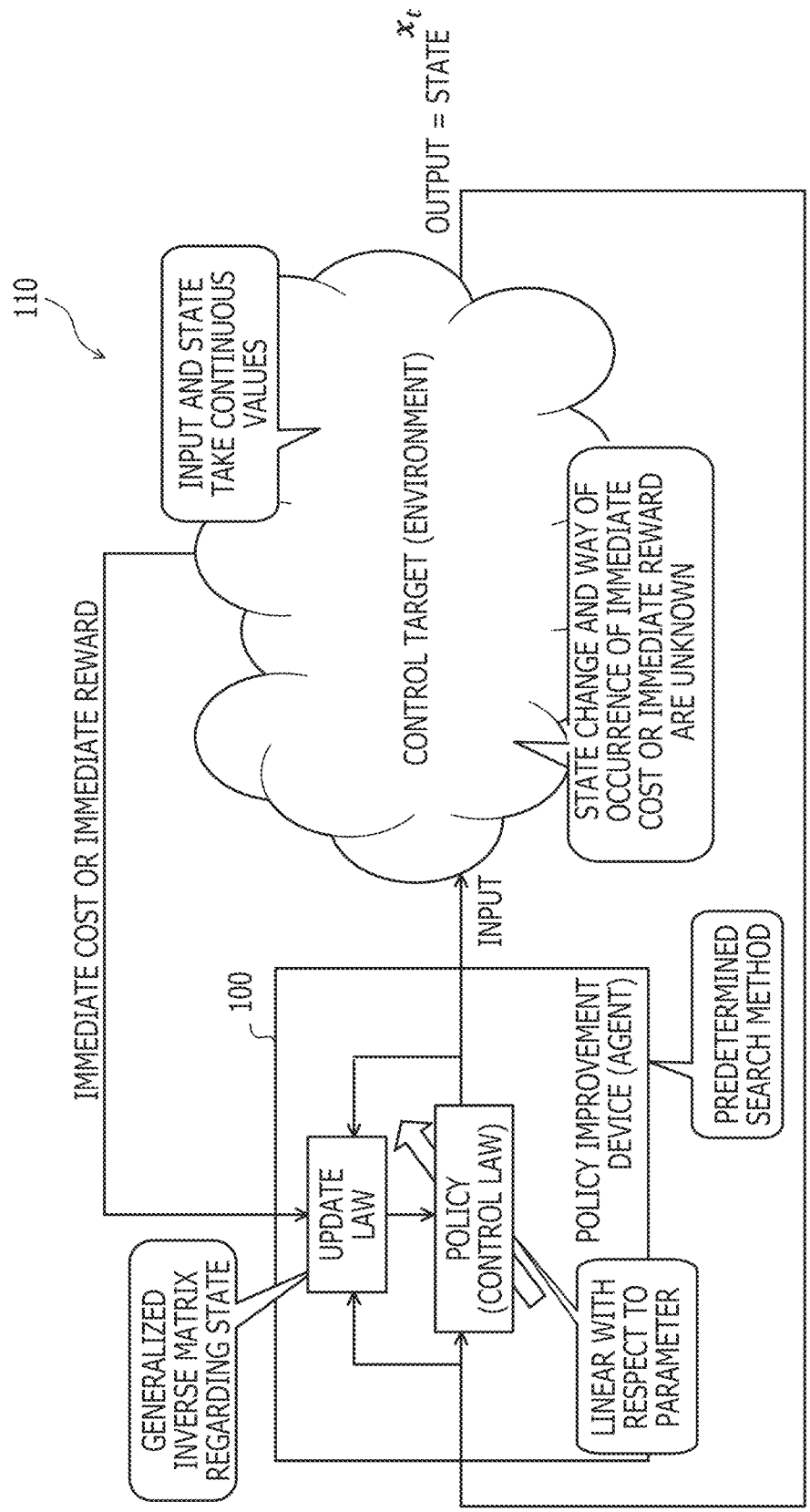
FIG. 1 is an explanatory diagram illustrating an example of a policy improvement method according to an embodiment.

FIG. 1 is an explanatory diagram illustrating an example of a policy improvement method according to an embodiment. The policy improvement device 100 is a computer which serves as an agent that controls the control target 110 by improving the policy at a predetermined timing and determining an input to the control target 110 by the policy. The policy improvement device 100 is, for example, a server, a personal computer (PC), a microcontroller, or the like.

The control target 110 is some object or event, such as a physical system that actually exists. The control target 110 is also called an environment. The control target 110 is, for example, a server room, an air conditioning apparatus, a power generation apparatus, an industrial machine, or the like. The policy is an equation which determines an input value for the control target 110 according to a predetermined parameter. The policy is also called a control law. The predetermined parameter is, for example, a feedback coefficient matrix.

The policy improvement corresponds to updating a policy parameter. The policy improvement is the modification of a policy so that the cumulative cost and cumulative reward may be optimized more efficiently. The input is an operation on the control target 110. The Input is also called an action. The state of the control target 110 changes according to the input to the control target 110, and an immediate cost or an immediate reward occurs. The state and immediate cost or immediate reward of the control target 110 are assumed to be observable.

A first control method is conceivable which controls the control target 110 by updating a policy parameter to improve the policy, with reference to the following Reference Document 1.

Reference Document 1: S. J. Bradtke, B. E. Ydstie and A. G. Barto, "Adaptive linear quadratic control using policy iteration", In Proc. of the 1994 American Control Conference, pp. 3475-3479, Baltimore, USA, 1994.

The first control method is, for example, a control method called an adaptive policy iteration. For example, the first control method perturbs an input or policy parameter, calculates a temporal difference error (TD error) regarding the input, and updates the policy parameter based on the calculated TD error.

However, since the first control method improves the policy of reinforcement learning based on the state-action value function (Q function), it may be difficult to determine what perturbation added to the input or policy parameter optimizes the cumulative cost or cumulative reward, and it may be difficult to improve the policy parameter. For example, it is impossible for the first control method to improve the policy parameter if the setting method of appropriately setting the perturbation to the input or policy parameter is not clear.

Note that, for the purpose of optimizing the cumulative cost and cumulative reward, there is a property that it is preferable to change the policy parameter in the direction along the gradient of the state value function (V function). With this property, a second control method is conceivable which controls the control target 110 by updating a policy parameter to improve the policy, with reference to the following Reference Documents 2 and 3.

Reference Document 2: T. Sasaki, E. Uchibe, H. Iwane, H. Yanami, H. Anai and K. Doya, "Policy gradient reinforcement learning method for discrete-time linear quadratic regulation problem using estimated state value function", in Proc. of the 56th Annual Conference of the Society of Instrument and Control Engineers of Japan (SICE), Kanazawa, 2017, pp. 653-657.

Reference Document 3: Japanese Laid-open Patent Publication No. 2019-053593

The second control method is, for example, a control method which estimates the gradient function matrix of the state value function and updates the policy parameter based on the result of selecting the policy parameter components one by one and, with a perturbation added only to the selected component, performing input decisions multiple times. This makes it possible for the second control method to change the policy parameter in the direction along the gradient of the state value function.

However, the second control method has a problem that the number of times input decisions are performed in the process of updating the policy parameter is likely to increase, and the processing load is likely to increase. The second control method performs multiple input decisions for each policy parameter component for the purpose of, for example, estimating the gradient function matrix of the state value function, which therefore leads to an increase in the number of input decisions, and leads to an increase in the processing load and processing time in proportion to the number of policy parameter components. The second control method also leads to an increase in the number of processes for observing the immediate cost or immediate reward by waiting for a predetermined time according to the input decision, which leads to an increase in the processing load and processing time.

From the above, a new control method is desired which makes it possible to update the policy parameter while suppressing an increase in the number of times input decisions are performed in the process of updating the policy parameter in the case of improving the policy of reinforcement learning based on the state value function.

Therefore, the present embodiments provide a description on a policy improvement method which makes it possible to reduce the number of times input decisions are performed in the process of updating the policy parameter by updating the policy parameter using a generalized inverse matrix regarding the state of the control target 110.

The example of FIG. 1 is in a situation where the state of the control target 110 and the input to the control target 110 take continuous values, and the state change of the control target 110 and the way of occurrence of the immediate cost or immediate reward are unknown. The control target 110 is in a situation where the state of the control target 110 is output and the state of the control target 110 is directly observable. The policy is deterministic, is a control law which calculates an input taking a continuous value, and is linear with respect to the policy parameter.

(1-1) The policy improvement device 100 calculates an input to the control target 110 based on the policy and a predetermined exploration method of exploring for the input to the control target 110. The predetermined exploration method is, for example, a exploration method in which a perturbation is added to the input calculated from the policy. The policy improvement device 100, for example, adds perturbation to the input calculated from the policy, and determines the input added perturbation as the input to the control target 110.

(1-2) Based on the result of applying the calculated input to the control target 110, the policy improvement device 100 uses the input to the control target 110 and the generalized inverse matrix regarding the state of the control target 110 to update the policy parameter. The parameter is, for example, a feedback coefficient matrix. The policy improvement device 100 updates the policy parameter with an update law using, for example, the input to the control target 110 and the generalized inverse matrix for the state of the control target 110. The update law corresponds to, for example, the update formula represented by the formula (25) described later.

As described above, the policy improvement device 100 makes it possible to update the policy parameter without estimating the gradient function matrix of the state value function by using the generalized inverse matrix regarding the state of the control target 110. As a result, the policy improvement device 100 does not have to estimate the gradient function matrix of the state value function, and it is therefore possible to reduce the number of input decisions for updating the policy parameter, regardless of the number of policy parameter components. The policy improvement device 100 is then allowed to also reduce the number of processes for observing the immediate cost or immediate reward by waiting for a predetermined time according to the input decision. Therefore, it is possible for the policy improvement device 100 to reduce the processing load and processing time.

The policy improvement device 100 may update the policy parameter so that the cumulative cost and cumulative reward are efficiently optimized, improving the policy efficiently. The policy improvement device 100 may update the policy parameter also in the case of improving the policy of reinforcement learning based on the state value function instead of the state-action value function, improving the policy efficiently.

A description has been provided for the case where the predetermined exploration method is a exploration method in which a perturbation is added to the input calculated from the policy, but the embodiment is not limited thereto. For example, the predetermined exploration method may be a exploration method in which a perturbation is added to the policy parameter. For example, the predetermined exploration method may be the E-greedy method.

(Hardware Configuration Example of Policy Improvement Device 100)

Next, a hardware configuration example of the policy improvement device 100 illustrated in FIG. 1 is described with reference to FIG. 2.

Figure 2:
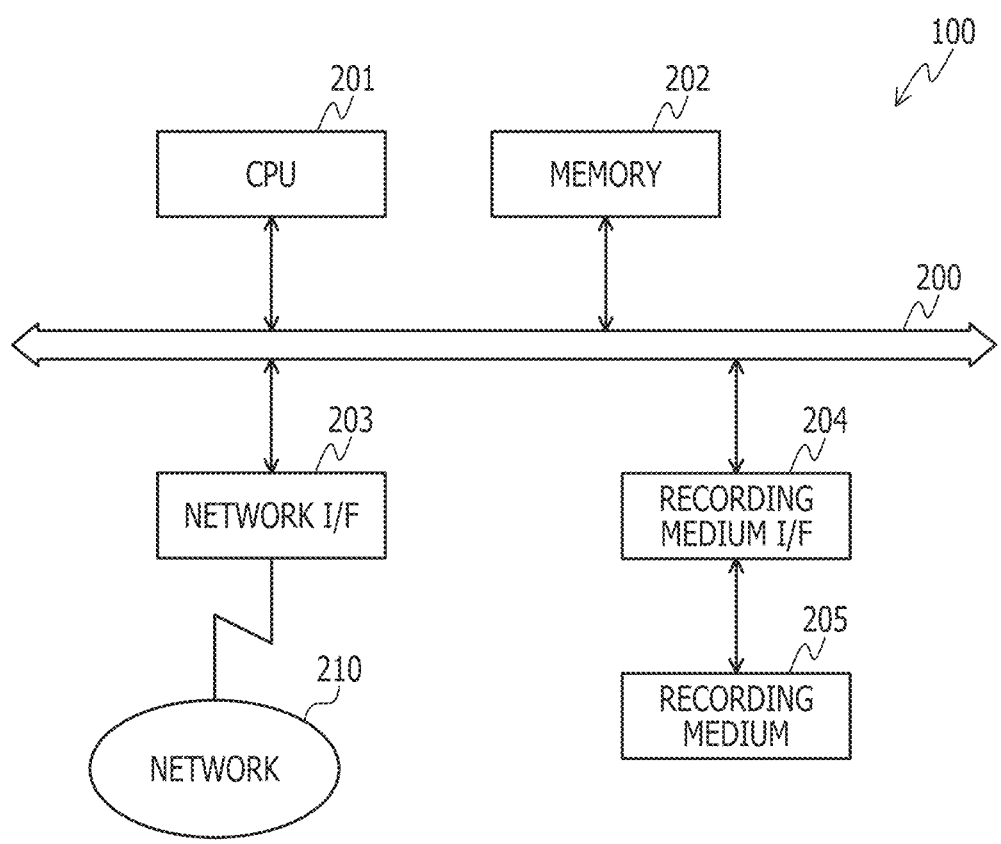
FIG. 2 is a block diagram illustrating a hardware configuration example of a policy improvement device.

FIG. 2 is a block diagram illustrating a hardware configuration example of the policy improvement device 100. In FIG. 2, the policy improvement device 100 includes a central processing unit (CPU) 201, a memory 202, a network interface (I/F) 203, a recording medium I/F 204, and a recording medium 205. Each of the configuration portions is coupled to each other via a bus 200.

The CPU 201 controls the entire policy improvement device 100. The memory 202 includes, for example, a read-only memory (ROM), a random-access memory (RAM), a flash ROM, and the like. For example, the flash ROM or the ROM stores various programs, and the RAM is used as a work area of the CPU 201. The program stored in the memory 202 causes the CPU 201 to execute coded processing by being loaded into the CPU 201. The memory 202 stores, for example, various tables described later in FIGS. 3 and 4.

The network I/F 203 is coupled to the network 210 through a communication line and is coupled to another computer via the network 210. The network I/F 203 controls the network 210 and an internal interface so as to control data input/output from/to the other computer. The network I/F 203 is, for example, a modem, a local area network (LAN) adapter, or the like.

The recording medium I/F 204 controls reading/writing of data from/to the recording medium 205 under the control of the CPU 201. The recording medium I/F 204 is, for example, a disk drive, a solid state drive (SSD), a Universal Serial Bus (USB) port, or the like. The recording medium 205 is a nonvolatile memory that stores the data written under the control of the recording medium I/F 204. The recording medium 205 may store various tables described later in FIGS. 3 and 4, for example. The recording medium 205 is, for example, a disk, a semiconductor memory, a USB memory, or the like. The recording medium 205 may be removable from the policy improvement device 100.

In addition to the above-described components, the policy improvement device 100 may include, for example, a keyboard, a mouse, a display, a touch panel, a printer, a scanner, a microphone, a speaker, and the like. The policy improvement device 100 may include multiple recording medium I/Fs 204 and recording media 205. The policy improvement device 100 does not have to include the recording medium I/F 204 or the recording medium 205.

(Stored Contents of Policy Improvement Table 300)

Next, an example of the stored contents of the policy improvement table 300 is described with reference to FIG. 3. The policy improvement table 300 is realized by, for example, a storage region such as the memory 202 or the recording medium 205 of the policy improvement device 100 illustrated in FIG. 2.

Figure 3:
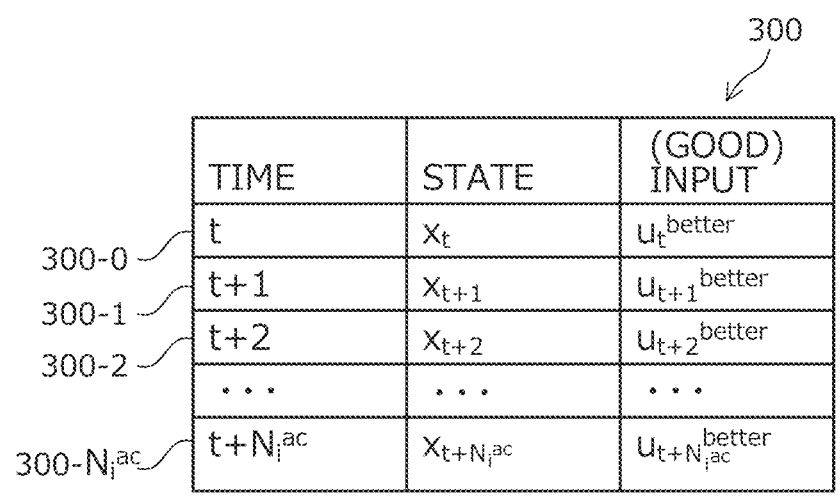
FIG. 3 is an explanatory diagram illustrating an example of the stored contents of a policy improvement table.

FIG. 3 is an explanatory diagram illustrating an example of the stored contents of the policy improvement table 300. As illustrated in FIG. 3, the policy improvement table 300 includes fields for time, state, and good input. In the policy improvement table 300, policy improvement information is stored as a record 300-$a$ by setting information in a field for each time. The value a is an arbitrary integer. In the example of FIG. 3, a is an arbitrary integer from 0 to $N_i^{ac}$.

In the time field, the time of applying the input to the control target 110 is set. In the time field, a time represented by a multiple of the unit time is set, for example. In the state field, the state of the control target 110 at the time set in the time field is set. In the good input field, the input to the control target 110 is set which has been determined to have a preferable effect at the time set in the time field. For example, in the good input field, the input to the control target 110 is set which has been determined to have a preferable effect, among the input to the control target 110 calculated based on the policy and exploration method and the input to the control target 110 calculated from the policy.

(Stored Contents of Policy Evaluation Table 400)

Next, an example of the stored contents of the policy evaluation table 400 is described with reference to FIG. 4. The policy evaluation table 400 is realized by, for example, a storage region such as the memory 202 or the recording medium 205 of the policy improvement device 100 illustrated in FIG. 2.

FIG. 4 is an explanatory diagram illustrating an example of the stored contents of the policy evaluation table 400. As illustrated in FIG. 4, the policy evaluation table 400 includes fields for time, state, input, and cost. In the policy evaluation table 400, policy improvement information is stored as a record 400-$b$ by setting information in a field for each time. The value b is an arbitrary integer. In the example of FIG. 4, b is an arbitrary integer from 0 to $N_e$.

In the time field, the time of applying the input to the control target 110 is set. In the time field, a time represented by a multiple of the unit time is set, for example. In the state field, the state of the control target 110 at the time set in the time field is set. In the input field, the input applied to the control target 110 at the time set in the time field is set. In the input field, the input calculated based on the policy and exploration method and applied to the control target 110 is set, for example. In the cost field, the immediate cost observed at the time set in the time field is set.

The policy evaluation table 400 may have a reward field instead of the cost field in the case of using immediate reward instead of immediate cost in reinforcement learning. In the reward field, the immediate reward observed at the time set in the time field is set.

(Functional Configuration Example of Policy Improvement Device 100)

Next, a functional configuration example of the policy improvement device 100 is described with reference to FIG. 5.

Figure 5:
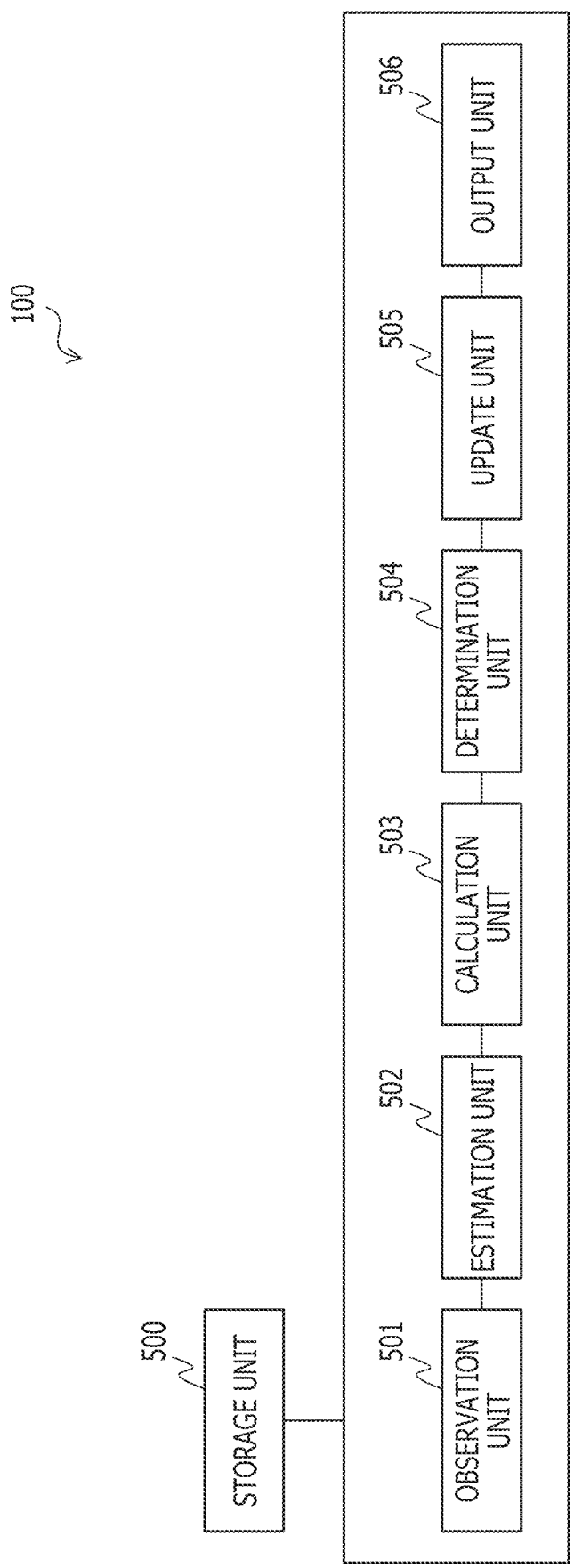
FIG. 5 is a block diagram illustrating a functional configuration example of the policy improvement device.

FIG. 5 is a block diagram illustrating a functional configuration example of the policy improvement device 100. The policy improvement device 100 includes a storage unit 500, an observation unit 501, an estimation unit 502, a calculation unit 503, a determination unit 504, an update unit 505, and an output unit 506.

The storage unit 500 is realized by using, for example, a storage region, such as the memory 202 or the recording medium 205 illustrated in FIG. 2. Hereinafter, the case where the storage unit 500 is included in the policy improvement device 100 is described, but the embodiment is not limited thereto. For example, there may be a case where the storage unit 500 is included in a device different from the policy improvement device 100, and the stored contents of the storage unit 500 are able to be referred to through the policy improvement device 100.

The units from the observation unit 501 to the output unit 506 function as an example of a control unit. For example, the functions of the units from the observation unit 501 to the output unit 506 are implemented by, for example, causing the CPU 201 to execute a program stored in the storage region such as the memory 202 or the recording medium 205 illustrated in FIG. 2, or by using the network I/F 203. Results of processing performed by each functional unit are stored, for example, in the storage region, such as the memory 202 or the recording medium 205 illustrated in FIG. 2.

The storage unit 500 stores a variety of pieces of information to be referred to or updated in the processing of each functional unit. The storage unit 500 stores the input, the state, and the immediate cost or immediate reward of the control target 110. The storage unit 500 stores, for example, the input, the state, and the immediate cost or immediate reward of the control target 110 at each time using the policy evaluation table 400 illustrated in FIG. 4. As a result, the storage unit 500 makes it possible for each functional unit to refer to the input, the state, and the immediate cost or immediate reward of the control target 110.

The control target 110 may be, for example, an air conditioning apparatus. In this case, the input is, for example, at least any of a set temperature of the air conditioning apparatus and a set air volume of the air conditioning apparatus. The state is, for example, at least any of a temperature inside a room with the air conditioning apparatus, a temperature outside the room with the air conditioning apparatus, and a weather. The cost is, for example, the power consumption of the air conditioning apparatus. The case where the control target 110 is an air conditioning apparatus is, for example, described later with reference to FIG. 8.

The control target 110 may be, for example, a power generation apparatus. The power generation apparatus is, for example, a wind power generation apparatus. In this case, the input is, for example, the generator torque of the power generation apparatus. The state is, for example, at least any of a power generation amount of the power generation apparatus, a rotation amount of a turbine of the power generation apparatus, a rotation speed of the turbine of the power generation apparatus, a wind direction with respect to the power generation apparatus, and a wind speed with respect to the power generation apparatus. The reward is, for example, the power generation amount of the power generation apparatus. The case where the control target 110 is a power generation apparatus is, for example, described later with reference to FIG. 9.

The control target 110 may be, for example, an industrial robot. In this case, the input is, for example, the motor torque of the industrial robot. The state is, for example, at least any of an image taken by the industrial robot, a joint position of the industrial robot, a joint angle of the industrial robot, and a joint angular velocity of the industrial robot. The reward is, for example, the production amount of the industrial robot. The production amount is, for example, the number of assemblies. The number of assemblies is, for example, the number of products assembled by the industrial robot. The case where the control target 110 is an industrial robot is, for example, described later with reference to FIG. 10.

The storage unit 500 may store the policy parameter. The policy is deterministic, is a control law which calculates an input taking a continuous value, and is linear with respect to the policy parameter. The storage unit 500 stores, for example, the policy parameter. The parameter is, for example, a feedback coefficient matrix. This allows the storage unit 500 to store the policy parameter to be updated at a predetermined timing. The storage unit 500 makes it possible for the calculation unit 503 and the update unit 505 to refer to the policy parameter.

The storage unit 500 stores a predetermined exploration method of exploring for an input to the control target 110 in reinforcement learning. The predetermined exploration method is, for example, a exploration method in which a perturbation is added to the input calculated from the policy. The predetermined exploration method is, for example, a exploration method in which a perturbation is added to the policy parameter. The predetermined exploration method is, for example, the E-greedy method. As a result, the storage unit 500 makes it possible for the calculation unit 503 to refer to a predetermined exploration method.

The storage unit 500 stores the input to the control target 110, which has been determined by the determination unit 504 to obtain a preferable effect. For example, the storage unit 500 stores for each time an input to the control target 110, which has been determined by the determination unit 504 to obtain a preferable effect. For example, the storage unit 500 stores for each time the input which has been determined by the determination unit 504 to obtain a preferable effect using the policy improvement table 300 illustrated in FIG. 3, among the input calculated based on the policy and exploration method and the input calculated from the policy. As a result, the storage unit 500 makes it possible for the update unit 505 to refer to the input which has been determined to obtain a preferable effect. For example, the storage unit 500 makes it possible for the update unit 505 to update the policy so that there appears a tendency to output the input which has been determined to obtain a preferable effect.

The observation unit 501 observes the state and the immediate cost or immediate reward of the control target 110, and outputs them to the storage unit 500. As a result, the observation unit 501 makes it possible for the storage unit 500 to accumulate the state and the immediate cost or immediate reward of the control target 110.

The estimation unit 502 estimates the state value function. The estimation unit 502 updates, for example, the estimated state value function obtained by estimating the state value function. For example, the estimation unit 502 updates the estimated state value function by updating the coefficient of the estimated state value function using the batch least-squares method, the recursive least-squares method, or the like. For example, the estimation unit 502 may update the estimated state value function by updating the coefficient of the estimated state value function using a batch least-squares temporal difference (LSTD) algorithm, a recursive LSTD algorithm, or the like. As a result, the estimation unit 502 makes it possible for the update unit 505 to refer to the estimated state value function in order to update the policy parameter. The estimation unit 502 may improve the state value function.

Regarding the batch least-squares method, the recursive least-squares method, the batch LSTD algorithm, the recursive LSTD algorithm, and the like, the following Reference Documents 4 and 5 may be referred to.

Reference Document 4: Y. Zhu and X. R. Li. Recursive least squares with linear constraints. Communications in Information and Systems, vol. 7, no. 3, pp. 287-312, 2007.

Reference Document 5: Christoph Dann and Gerhard Neumann and Jan Peters. Policy Evaluation with Temporal Differences: A Survey and Comparison. Journal of Machine Learning Research, vol. 15, pp. 809-883, 2014.

The calculation unit 503 calculates an input to the control target 110, and applies it to the control target 110. The calculation unit 503 calculates an input to the control target 110 based on, for example, the policy and a predetermined exploration method, and applies it to the control target 110. For example, when the predetermined exploration method is a exploration method in which a perturbation is added to the input calculated from the policy, the calculation unit 503 adds a perturbation to the input calculated from the policy, determines the perturbed input as the input to the control target 110, and applies it to the control target 110. As a result, the calculation unit 503 searches whether or not there is a more appropriate input than the input determined to be currently optimal, and thus is allowed to apply an input other than the input determined to be currently optimal to the control target 110.

For example, when the predetermined exploration method is a exploration method in which a perturbation is added to the policy parameter, the calculation unit 503 adds a perturbation to the policy parameter, determines the input calculated from the policy obtained by adding a perturbation to the parameter as the input to the control target 110, and applies it to the control target 110. The adding a perturbation to the policy parameter corresponds to generating another policy in the case where the policy parameter is perturbed, and the policy to be updated is not changed. As a result, the calculation unit 503 searches whether or not there is a more appropriate input than the input determined to be currently optimal, and thus is allowed to apply an input other than the input determined to be currently optimal to the control target 110.

When the predetermined exploration method is the ε-greedy method, the calculation unit 503 determines the input calculated from the policy as the input to the control target 110 with the probability of 1-ε and applies it to the control target 110, and determines a random input as the input to the control target 110 with the probability of ε and applies it to the control target 110. As a result, the calculation unit 503 searches whether or not there is a more appropriate input than the input determined to be currently optimal, and thus is allowed to apply an input other than the input determined to be currently optimal to the control target 110.

The determination unit 504 determines whether or not to use the input calculated by the calculation unit 503 to update the policy parameter based on the result of applying the input calculated by the calculation unit 503 to the control target 110. The result of applying is, for example, the immediate cost of the control target 110 observed by the observation unit 501 in response to the input calculated by the calculation unit 503 being applied to the control target 110.

When determining to use the input calculated by the calculation unit 503, the determination unit 504 records the input calculated by the calculation unit 503. The recording destination is, for example, the storage unit 500, and, for example, the policy improvement table 300 illustrated in FIG. 3. On the other hand, when determining not to use the input calculated by the calculation unit 503, the determination unit 504 records a different input to the control target 110 calculated from the policy. The different input may be calculated by subtracting a perturbation from the input calculated by the calculation unit 503 if, for example, the predetermined exploration method is a exploration method in which a perturbation is added to the input calculated from the policy. The recording destination is, for example, the storage unit 500, and, for example, the policy improvement table 300 illustrated in FIG. 3.

The determination unit 504 calculates the TD error based on, for example, the result of applying the input calculated by the calculation unit 503 to the control target 110 and the result of estimating the state value function by the estimation unit 502. When determining that a preferable effect has been obtained with the input calculated by the calculation unit 503 based on the calculated TD error, the determination unit 504 determines to use the input calculated by the calculation unit 503, and records it. On the other hand, when determining that a preferable effect is not obtained with the input calculated by the calculation unit 503 based on the calculated TD error, the determination unit 504 determines not to use the input calculated by the calculation unit 503, and records a different input calculated from the policy.

For example, when the TD error is less than 0, the determination unit 504 determines that a preferable effect has been obtained with the input calculated by the calculation unit 503, and records the input calculated by the calculation unit 503. On the other hand, when the TD error is 0 or more, the determination unit 504 determines that a preferable effect is not obtained with the input calculated by the calculation unit 503, and records a different input calculated from the policy. As a result, the determination unit 504 makes it possible for the update unit 505 to refer to the input to the control target 110, which is determined to have obtained a preferable effect. For example, the determination unit 504 makes it possible for the update unit 505 to update the policy so that there appears a tendency to output the input which has been determined to obtain a preferable effect.

The determination unit 504 records the state of the control target 110 when the calculation unit 503 calculates the input. The determination unit 504 records, for example, the state of the control target 110 when the calculation unit 503 calculates the input, using the policy improvement table 300 illustrated in FIG. 3. As a result, the determination unit 504 makes it possible for each functional unit to refer to the state of the control target 110.

The update unit 505 updates the policy parameter. Based on the result of applying the calculated input to the control target 110, the update unit 505 uses the input to the control target 110 and the generalized inverse matrix regarding the state of the control target 110 to update the policy parameter. The generalized inverse matrix regarding the state of the control target 110 is, for example, the Moore-Penrose generalized inverse matrix (pseudo-inverse matrix).

The update unit 505 updates the policy parameter, for example, every time the calculation unit 503 and the determination unit 504 each execute a process once. For example, the update unit 505 updates the policy parameter when the determination unit 504 determines to use the input after the calculation unit 503 and the determination unit 504 each execute a process once. For example, the update unit 505 updates the policy parameter using the input recorded by the determination unit 504 and the generalized inverse matrix regarding the state recorded by the determination unit 504. As a result, the update unit 505 is allowed to update the policy parameter even when the number of input decisions is one, regardless of the number of policy parameter components.

The update unit 505 updates the policy parameter, for example, every time the calculation unit 503 and the determination unit 504 each execute processes multiple times. For example, the update unit 505 updates the policy parameter if the determination unit 504 has determined once or more to use the input after the calculation unit 503 and the determination unit 504 each execute processes multiple times. For example, the update unit 505 updates the policy parameter using the inputs to the control target 110 recorded multiple times by the determination unit 504 and the generalized inverse matrix regarding the states of the control target 110 recorded multiple times by the determination unit 504. At this moment, the update unit 505 updates the policy parameter so that there appears a tendency to output the input determined by the determination unit 504 to have obtained a preferable effect and not to output the input determined by the determination unit 504 to not have obtained a preferable effect.

For example, the update unit 505 updates the policy parameter using an update formula represented by a matrix formed by arranging inputs to the control target 110 recorded multiple times and a generalized inverse matrix of a matrix formed by arranging states of the control target 110 recorded multiple times. As a result, the update unit 505 is allowed to update the policy parameter while reducing the number of input decisions, regardless of the number of policy parameter components.

The output unit 506 outputs the processing result of at least any of the functional units. Examples of the output format include, for example, display on a display, printing output to a printer, transmission to an external device by a network I/F 203, and storing in a storage region, such as the memory 202 or the recording medium 205. The output unit 506 outputs, for example, the updated policy. As a result, the output unit 506 is allowed to control the control target 110 with another computer.

(Example of Reinforcement Learning)

Next, an example of reinforcement learning is described with reference to FIG. 6. This example corresponds to the case where the immediate cost of the control target 110 is used in reinforcement learning.

Figure 6:
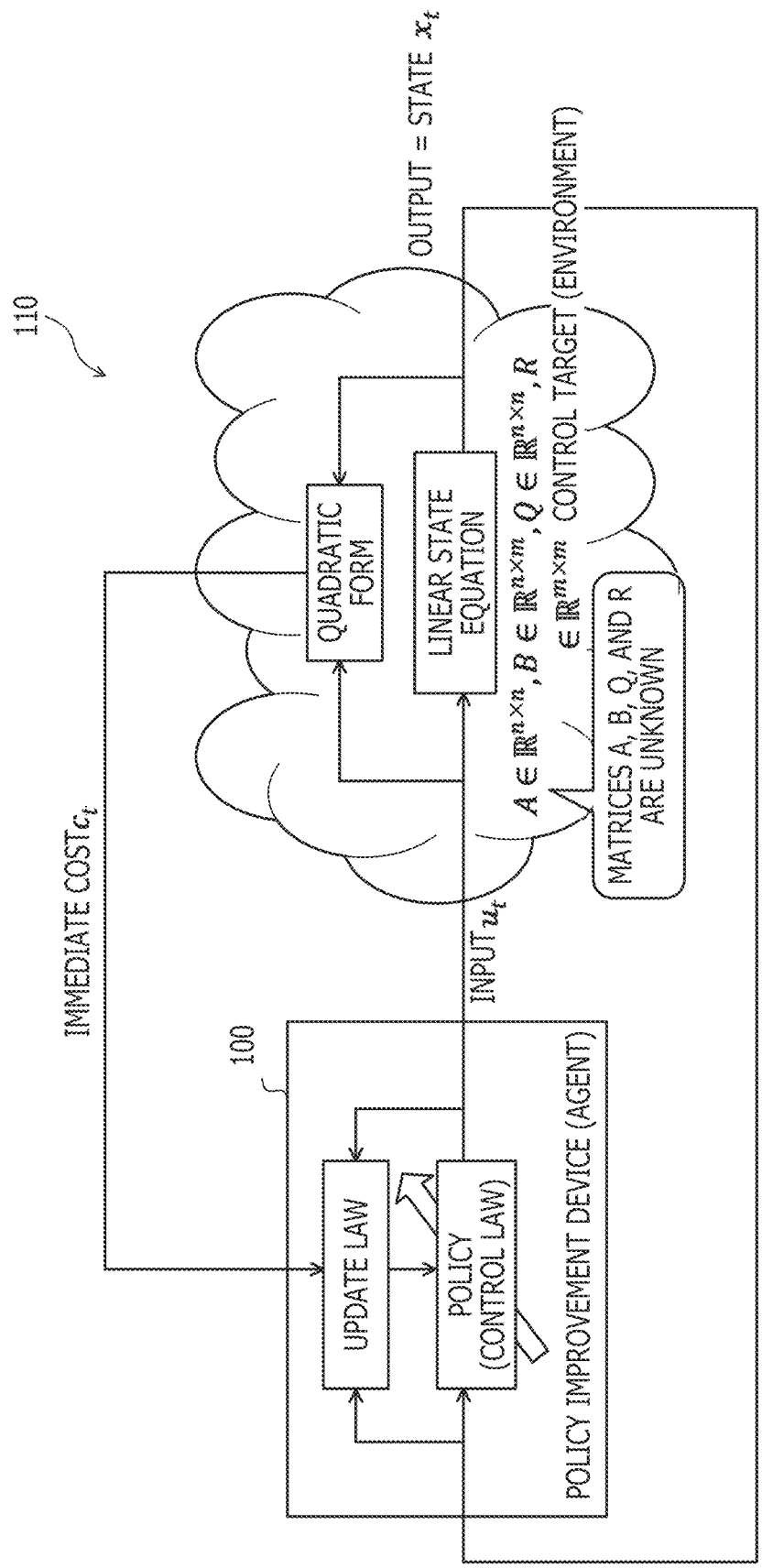
FIG. 6 is an explanatory diagram illustrating an example of reinforcement learning.

FIG. 6 is an explanatory diagram illustrating an example of reinforcement learning. As illustrated in FIG. 6, in the example, the following formulas (1) to (9) define the discrete-time linear time-invariant deterministic state equation of the control target 110, the quadratic equation of the immediate cost, the purpose, and the policy, and sets the problem. In the example, the state of the control target 110 is directly observable.

$$x_{t+1} = Ax_t + Bu_t \quad (1)$$

The above formula (1) is a state equation of the control target 110. The value t is a time indicated by a multiple of the unit time. The value t+1 is the next time after a unit time has elapsed from the time t. The symbol $x_{t+1}$ is the state at the next time t+1. The symbol $x_t$ is the state at the time t. The symbol $u_t$ is the input at the time t. A and B are coefficient matrices. The above formula (1) indicates that the state $x_{t+1}$ at the next time t+1 has a relationship determined by the state $x_t$ at the time t and the input $u_t$ at the time t. The coefficient matrices A and B are unknown.

$$x_0 \in \mathbb{R}^n \quad (2)$$

The above formula (2) indicates that the state $x_0$ is n-dimensional. The value n is known. The hollow character R indicates a real number space. The superscript of the hollow character R indicates the number of dimensions.

$$u_t \in \mathbb{R}^m, t=0,1,2,\ldots \quad (3)$$

The above formula (3) indicates that the input $u_t$ is m-dimensional.

$$A \in \mathbb{R}^{n \times n}, B \in \mathbb{R}^{n \times m} \quad (4)$$

The above equation (4) indicates that the coefficient matrix A has n×n dimensions (n rows and n columns), and the coefficient matrix B has n×m dimensions (n rows and m columns). The (A, B) is controllable.

$$c_t = c(x_t, u_t) = x_t^T Q x_t + u_t^T R u_t \quad (5)$$

The above formula (5) is an equation of the immediate cost generated in the control target 110. The symbol $c_t$ is an immediate cost which occurs after the unit time according to the input $u_t$ at the time t. The superscript T indicates transposition. The above formula (5) indicates that the immediate cost $c_t$ has a relationship determined by the quadratic form of the state $x_t$ at the time t and the input $u_t$ at the time t. The coefficient matrices Q and R are unknown. The immediate cost $c_t$ is directly observable.

$$Q \in \mathbb{R}^{n \times n}, Q = Q^T \geq 0, R \in \mathbb{R}^{m \times m}, R = R^T > 0 \quad (6)$$

The above formula (6) indicates that the coefficient matrix Q has n×n dimensions. The ≥0 part indicates that the matrix is a positive semidefinite matrix. The above formula (6) indicates that the coefficient matrix R has m×m dimensions. The >0 part indicates that the matrix is a positive definite matrix.

$$V = \sum_{t=0}^{\infty} \gamma^t c_t \quad (7)$$

The above formula (7) is an equation representing the cumulative cost V. The purpose of reinforcement learning is to minimize the cumulative cost V. The symbol $\gamma$ is a discount rate. The symbol $\gamma$ has a value of 0 to 1.

$$u_t = F_t x_t \quad (8)$$

Under the above formulas (1) to (7), the policy for minimizing the cumulative cost V is represented by the above formula (8). Therefore, in the following description, the case where the policy is represented by the above formula (8) is described. The symbol $F_t$ is a feedback coefficient matrix used at the time t, and represents a coefficient matrix related to the state $x_t$. The above formula (8) is an equation which determines the input $u_t$ at the time t based on the state $x_t$ at the time t. The policy has the characteristic that it is linear with respect to the state $x_t$ and linear with respect to the feedback coefficient matrix $F_t$.

$$F_t \in \mathbb{R}^{m \times n}, t = 0,1,2,\ldots \quad (9)$$

The above formula (9) indicates that the feedback coefficient matrix $F_t$ has m×n dimensions. In the following description, the feedback coefficient matrix $F_t$ may be simply referred to as the "feedback coefficient matrix F". Next, a specific example of updating the feedback coefficient matrix F is described with reference to Reference Documents 2 and 3 described above.

<Specific Example of Updating Feedback Coefficient Matrix F with Reference to Reference Documents 2 and 3>

If the policy is represented by the above formula (8), when the control of the control target 110 by reinforcement learning is started from the state x at time 0, the cumulative cost V is represented by a state value function v(x: F), which is a function of the feedback coefficient matrix F and the state x.

For the purpose of minimizing the cumulative cost V, it is preferable to change the feedback coefficient matrix F in the direction along the gradient function matrix $\nabla_F v(x: F)$ with respect to the feedback coefficient matrix F of the state value function v(x: F).

Meanwhile, according to Reference Documents 2 and 3 described above, the control method α is conceivable. For example, the control method α selects the components of the feedback coefficient matrix F one by one, performs an input decision with a perturbation added only to the selected components, estimates the gradient function matrix $\nabla_F v(x: F)$, and updates the feedback coefficient matrix F. The control method α is described in detail.

The control method α repeats $N_i$ times the process of adding a perturbation to the (i, j) component $F_{ij}$ of the feedback coefficient matrix F with the mathematical formula of the feedback coefficient matrix $F + \varepsilon E_{ij}$, and performing an input decision. The (i, j) is an index that specifies a matrix element. The index (i, j) specifies, for example, the element on the i-th row and the j-th column of the matrix F. $E_{ij}$ is an m×n dimensional matrix in which the component specified by the index (i, j) is 1 and the components other than that component are 0. The ε is a non-zero real number.

The control method α uses the feedback coefficient matrix $F + \varepsilon E_{ij}$ instead of $F_t$ in the above formula (8) to perform an input decision. In this case, the state value function v(x: $F + \varepsilon E_{ij}$) is represented by the following formula (10).

$$v(x:F + \varepsilon E_{ij}) = v(x:F) + \frac{\partial v}{\partial F_{ij}}(x:F)\varepsilon + O(\varepsilon^2) \quad (10)$$

As a result, it is possible to represent the TD error corresponding to the decided input with the partial differential coefficient of the state value function with respect to the (i, j) component $F_{ij}$ of the feedback coefficient matrix F.

When the state change of the control target 110 follows the linear time-invariant deterministic dynamics and the immediate cost is represented in a quadratic form, the state value function v(x: F) is represented in a quadratic form as in the following formula (11).

$$v(x:F) = x^T P_F x \quad (11)$$

Thus, the function $\partial v / \partial F_{ij}(x: F)$, which is obtained by partially differentiating the state value function v(x: F) with respect to the (i, j) component $F_{ij}$ of the feedback coefficient matrix F, is represented in a quadratic form as in the following formula (12). In the following description, a partially differentiated function may be referred to as a "partial derivative".

$$\frac{\partial v}{\partial F_{ij}}(x:F) = x^T \frac{\partial P_F}{\partial F_{ij}} x \quad (12)$$

The control method α uses the vector $\theta_{F_{ij}}^F$ obtained by the above formula (12) and the following formula (13), and calculates an estimation function of the partial derivative $\partial v/\partial F_{ij}(x: F)$ with respect to the (i, j) component $F_{ij}$ of the feedback coefficient matrix F. The symbol with superimposed "∘" and "×" indicates the Kronecker product. The superscript Kronecker product indicates the Kronecker product of the same variables. The number attached to the superscript Kronecker product indicates the number of Kronecker products. The $\delta_F(x: \varepsilon E_{ij})$ is the TD error.

$$\frac{1}{\varepsilon}\delta_F(x:\varepsilon E_{ij}) \simeq [x^{\otimes 2} - \gamma \varphi_{+1}(x:F + \varepsilon E_{ij})^{\otimes 2}]^T \theta_{F_{ij}}^F \quad (13)$$

Similarly, the control method α repeats the process of adding a perturbation and performing an input decision $N_i$ times also for other components of the feedback coefficient matrix F, and calculates the estimation function of the partial derivative $\partial v/\partial F_{ij}(x: F)$. The control method α then uses the estimation function of the partial derivative $\partial v/\partial F_{ij}$ to generate an estimated gradient function matrix estimating the gradient function matrix $\nabla_F v(x: F)$ of the feedback coefficient matrix. As a result, the control method α is allowed to update the feedback coefficient matrix F based on the estimated gradient function matrix obtained by estimating the gradient function matrix $\nabla_F v(x: F)$.

However, the control method α performs an input decision $N_i$ times for each component of the feedback coefficient matrix F for the purpose of estimating the gradient function matrix $\nabla_F v(x: F)$, and thus performs an input decision n×m×$N_i$ times before the feedback coefficient matrix F is updated. The control method α performs an input decision n×m×$N_i$ times, which also leads to an increase in the number of processes for observing the immediate cost or immediate reward by waiting for a predetermined time according to the input decision. As a result, the control method α leads to an increase in the processing load and processing time.

Therefore, it is desired to reduce the number of input decisions and reduce the processing load and processing time. Regarding this, a specific example is described in which the policy improvement device 100 may update the feedback coefficient matrix F while reducing the number of input decisions.

<Specific Example in which Policy Improvement Device 100 Updates Feedback Coefficient Matrix F>

This specific example corresponds to the case where the policy improvement device 100 updates the feedback coefficient matrix F in a batch processing format.

In the following description, in the case where the above formulas (1) to (9) set the problem and the policy is represented by the above formula (8), the state value function v(•; F) is defined, for example, by the following formula (14).

$$v(\bullet;F): \mathbb{R}^n \to \mathbb{R} \quad (14)$$

The estimated state value function obtained by estimating the state value function v(•; F) is defined by the following formula (15) with ^added on top, for example. The $\theta_F$ is a parameter of the estimated state value function. The $\theta_F$ is, for example, a real vector or a real matrix. The estimation of the state value function corresponds to updating $\theta_F$, for example.

$$\hat{v}(\bullet;\theta_F):\mathbb{R}^n \to \mathbb{R} \quad (15)$$

<<Flow in which Policy Improvement Device 100 Updates Feedback Coefficient Matrix F>>

First, description is provided for the flow in which the policy improvement device 100 updates the feedback coefficient matrix F.

(6-1) The policy improvement device 100 calculates an input to the control target 110 based on the policy and a predetermined exploration method, and applies it to the control target 110. The exploration is calculating an input different from the input determined to be optimal by the current policy.

The predetermined exploration method is, for example, a exploration method in which the perturbation term $\varepsilon_t$ is added to the input calculated from the policy, and is defined by the following formula (16).

$$u_t = Fx_t + \varepsilon_t \quad (16)$$

The perturbation term $\varepsilon_t$ is defined by the following formula (17), for example. The following formula (17) indicates that the perturbation term $\varepsilon_t$ is m-dimensional.

$$\varepsilon_t \in \mathbb{R}^m \quad (17)$$

It is assumed that the policy improvement device 100 calculates the input including the perturbation term $\varepsilon_t$ with the above formula (16), and applies it to the control target 110.

(6-2) The policy improvement device 100 calculates the TD error based on the estimated state value function obtained by estimating the state value function $v(\bullet; F)$.

(6-3) The policy improvement device 100 determines whether or not a preferable effect has been obtained by the input including the calculated perturbation term $\varepsilon_t$ based on the TD error. The preferable effect is determined from the viewpoint of cumulative cost. For example, when the TD error is less than 0, the policy improvement device 100 determines that a preferable effect has been obtained.

When the preferable effect has been obtained by the input including the perturbation term $\varepsilon_t$, the policy improvement device 100 records the input including the perturbation term $\varepsilon_t$ in the policy improvement table 300 illustrated in FIG. 3. The policy improvement device 100 then records the state of the control target 110 when the input is calculated in the policy improvement table 300 illustrated in FIG. 3.

On the other hand, when the preferable effect is not obtained by the input including the perturbation term $\varepsilon_t$, the policy improvement device 100 records the input calculated from the policy and not including the perturbation term $\varepsilon_t$ in the policy improvement table 300 illustrated in FIG. 3. The policy improvement device 100 then records the state of the control target 110 when the input is calculated in the policy improvement table 300 illustrated in FIG. 3.

(6-4) For the purpose of updating the feedback coefficient matrix F in a batch processing format, the policy improvement device 100 repeats the processes of (6-1) to (6-3) multiple times, and proceeds to the process of (6-5).

(6-5) The policy improvement device 100 updates the feedback coefficient matrix F when there is one or more inputs including the perturbation term $\varepsilon_t$ for which it is determined that a preferable effect has been obtained. For example, when there is one or more inputs including the perturbation term $\varepsilon_t$ for which the TD error is less than 0, the policy improvement device 100 updates the feedback coefficient matrix F with an update formula using a matrix in which recorded inputs are arranged and a generalized inverse matrix of a matrix in which recorded states are arranged.

On the other hand, the policy improvement device 100 does not update the feedback coefficient matrix F when there is no input including the perturbation term $\varepsilon_t$ for which it is determined that a favorable effect has been obtained. For example, the policy improvement device 100 does not update the feedback coefficient matrix F when there is no input including the perturbation term $\varepsilon_t$ for which the TD error is less than 0.

(6-6) The policy improvement device 100 repeats the processes of (6-1) to (6-5). For example, the policy improvement device 100 repeats the processes of (6-1) to (6-5) a predetermined number of times. The policy improvement device 100 may repeat the processes of (6-1) to (6-5) until the difference in the feedback coefficient matrix F before and after the update becomes a certain value or less, for example.

As a result, the policy improvement device 100 may update the feedback coefficient matrix F while reducing the number of input decisions regardless of the size of the feedback coefficient matrix F.

<<Details of how Policy Improvement Device 100 Updates Feedback Coefficient Matrix F>>

Next, description is provided for the details of how the policy improvement device 100 updates the feedback coefficient matrix F. In the initial state, time t=1.

(6-10) The policy improvement device 100 observes the state $x_t$ at the time t.

(6-11) At the time t, the policy improvement device 100 calculates the input $u_t$ including the perturbation term $\varepsilon_t$ with the above formula (16), and applies it to the control target 110.

(6-12) The policy improvement device 100 observes the immediate cost $c_t$ at the time t. After that, the policy improvement device 100 observes the state $x_{t+1}$ at the next time t+1.

(6-13) The policy improvement device 100 calculates the TD error $\delta_t$ with the following formula (18) based on the observed immediate cost $c_t$, the observed state $x_t$, the observed state $x_{t+1}$, and the estimated state value function obtained by estimating the state value function $v(\bullet; F)$.

$$\delta_t = c_t + \gamma \hat{v}(x_{t+1};\theta_F) - \hat{v}(x_t;\theta_F) \quad (18)$$

(6-14) When the TD error $\delta_t < 0$, the policy improvement device 100 determines that a preferable effect has been obtained with the input $u_t$ including the perturbation term $\varepsilon_t$, and records the input $u_t$ including the perturbation term $\varepsilon_t$ and the observed state $x_t$ in the policy improvement table 300 illustrated in FIG. 3. On the other hand, when the TD error $\delta_t \geq 0$, the policy improvement device 100 determines that a preferable effect is not obtained with the input $u_t$ including the perturbation term $\varepsilon_t$, and records the input $u_t - \varepsilon_t$ not including the perturbation term $\varepsilon_t$ and the observed state $x_t$ in the policy improvement table 300 illustrated in FIG. 3.

(6-15) Also at times t=2, 3, . . . , and $N_t^{ac}$, the policy improvement device 100 executes the processes of (6-11) to (6-14), and proceeds to the process of (6-16). As a result, the policy improvement device 100 repeats the processes of (6-11) to (6-14) $N_t^{ac}$ times. The policy improvement device 100 here measures the number M of times that the TD error $\delta_t < 0$.

(6-16) When M>0, the policy improvement device 100 updates the feedback coefficient matrix F. For simplification of description, M states $x_t$ recorded when TD error $\delta_t<0$ are defined by the following formula (19), for example. The superscript (•) is a number attached to the state $x_t$ for the sake of convenience.

$$x^{(1)}, \ldots, x^{(M)} \quad (19)$$

For example, M inputs $u_t$ recorded when TD error $\delta_t<0$ are defined by the following formula (20). The superscript (•) is a number attached to the input $u_t$ for the sake of convenience.

$$u^{(1)}, \ldots, u^{(M)} \quad (20)$$

For example, the $N_i^{ac}-M$ states $x_t$ recorded when the TD error $\delta_t \geq 0$ are defined by the following formula (21). The subscript (•) is a number attached to the state $x_t$ for the sake of convenience, and has a different meaning from the time t.

$$x_{(1)}, \ldots, x_{(N_i^{ac}-M)} \quad (21)$$

For example, the $N_i^{ac}-M$ inputs $u_t$ recorded when the TD error $\delta_t<0$ are defined by the following formula (22). The subscript (•) is a number attached to the input $u_t$ for the sake of convenience, and has a different meaning from the time t.

$$u_{(1)}-\varepsilon_{(1)}, \ldots, u_{(N_i^{ac}-M)}-\varepsilon_{(N_i^{ac}-M)} \quad (22)$$

For example, a matrix X in which M states $x_t$ defined by the above formula (19) and $N_i^{ac}-M$ states $x_t$ defined by the above formula (21) are arranged is defined by the following formula (23).

$$X:=[x^{(1)}, \ldots, x^{(M)}, x_{(1)}, \ldots, x_{(N_i^{ac}-M)}] \quad (23)$$

For example, a matrix $U^{better}$ in which M states $u_t$ defined by the above formula (20) and $N_i^{ac}-M$ states $u_t$ defined by the above formula (22) are arranged is defined by the following formula (24).

$$U^{better}:=[u^{(1)}, \ldots, u^{(M)}, u_{(1)}-\varepsilon_{(1)}, \ldots, u_{(N_i^{ac}-M)}-\varepsilon_{(N_i^{ac}-M)}] \quad (24)$$

For example, the policy improvement device 100 updates the feedback coefficient matrix F based on the matrix X defined by the above formula (23) and the matrix $U^{better}$ defined by the above formula (24) with the update formula represented by the following formula (25). The value $\beta$ is a weight which takes a value greater than 0 and less than or equal to 1. There may be a case where $\beta=1$. The symbol † indicates the Moore-Penrose generalized inverse matrix.

$$F \leftarrow (1-\beta)F + \beta U^{better} X^\dagger \quad (25)$$

The policy improvement device 100 then proceeds to the process of (6-17).

On the other hand, when M=0, the policy improvement device 100 does not update the feedback coefficient matrix F, and proceeds to the process of (6-17).

(6-17) The policy improvement device 100 estimates the parameter $\theta_F$ of the estimated state value function defined by the above formula (15). The policy improvement device 100 estimates the parameter $\theta_F$ using the batch least-squares method, the recursive least-squares method, the batch LSTD algorithm, the recursive LSTD algorithm, or the like based on the state $x_t$ and the immediate cost $c_{t+1}$ for the times t=1, 2, . . . , and $N_i^{ac}$, for example. After that, the policy improvement device 100 returns to the process of (6-11).

As a result, the policy improvement device 100 does not have to estimate the gradient function matrix of the state value function v(•; F), and thus may update the feedback coefficient matrix F while reducing the number of input decisions regardless of the size of the feedback coefficient matrix F. The policy improvement device 100 is then allowed to also reduce the number of processes for observing the immediate cost by waiting for a predetermined time according to the input decision. Therefore, it is possible for the policy improvement device 100 to reduce the processing load and processing time.

The policy improvement device 100 may update the feedback coefficient matrix F so that the cumulative cost is efficiently optimized, improving the policy efficiently. Even when it is not clear what perturbation term $\varepsilon_t$ is appropriate for the input or feedback coefficient matrix F, the policy improvement device 100 may update the feedback coefficient matrix F, improving the policy efficiently.

Next, with reference to the update formula represented by the above formula (25), description is provided for the theoretical background in which the feedback coefficient matrix F is enabled to update using the generalized inverse matrix $X^\dagger$ of the matrix X formed by arranging the states $x_t$.

(Theoretical Background in which Feedback Coefficient Matrix F is Enabled to Update Using Generalized Inverse Matrix $X^\dagger$)

When the estimation accuracy of the state value function v(•; F) is relatively high and when the TD error for the input $u_t$ to which the perturbation term $\varepsilon_t$ is added satisfies $\delta_t<0$, it is determined that the perturbation term $\varepsilon_t$ is a useful term with which a preferable effect is obtained from the viewpoint of reducing the cumulative cost. In this case, it is determined that the input $u_t$ to which the perturbation term $\varepsilon_t$ is added is a useful input with which a preferable effect is obtained from the viewpoint of reducing the cumulative cost.

On the other hand, when the TD error for the input $u_t$ to which the perturbation term $\varepsilon_t$ is added satisfies $\delta_t \geq 0$, it is determined that the perturbation term $\varepsilon_t$ is a useless term with which a preferable effect is not obtained from the viewpoint of reducing the cumulative cost. In this case, it is determined that the input $u_t$ to which the perturbation term $\varepsilon_t$ is added is a useless input with which a preferable effect is not obtained from the viewpoint of reducing the cumulative cost. Accordingly, it is determined that the input $u_t-\varepsilon_t$ not including the perturbation term $\varepsilon_t$ is a useful input with which a preferable effect is obtained from the viewpoint of reducing the cumulative cost.

Assume that, in the following description, by the policy, an ideal feedback coefficient matrix, which enables outputting the input $u_t$ to which a useful perturbation term $\varepsilon_t$ is added and the input $u_t-\varepsilon_t$ not including the useful perturbation term $\varepsilon_t$, is $F=F_{new}^{ideal}$. The feedback coefficient matrix $F_{new}^{ideal}$ is defined by the following formula (26).

$$F_{new}^{ideal} \in \mathbb{R}^{m \times n} \quad (26)$$

According to the feedback coefficient matrix $F_{new}^{ideal}$, the following formulas (27) and (28) are established.

$$F_{new}^{ideal} x^{(1)} = u^{(1)} \quad (27)$$
$$F_{new}^{ideal} x^{(2)} = u^{(2)}$$
$$\vdots$$
$$F_{new}^{ideal} x^{(M)} = u^{(M)}$$

$$F_{new}^{ideal} x_{(1)} = u_{(1)} - \varepsilon_{(1)} \quad (28)$$
$$F_{new}^{ideal} x_{(2)} = u_{(2)} - \varepsilon_{(2)}$$
$$\vdots$$
$$F_{new}^{ideal} x_{(N_i^{ac}-M)} = u_{(N_i^{ac}-M)} - \varepsilon_{(N_i^{ac}-M)}$$

Thus, it is desired to update the feedback coefficient matrix F to the ideal feedback coefficient matrix $F_{new}^{ideal}$. For example, it is desired to update the feedback coefficient matrix F so that the above formulas (27) and (28) are established.

When summarized into one formula, the above formulas (27) and (28) are defined by the following formula (29).

$$F_{new}^{ideal}[x^{(1)}, \ldots, x^{(M)}, x_{(1)}, \ldots, x_{(N_i^{ac}-M)}] = [u^{(1)}, \ldots, u^{(M)}, u_{(1)} - \varepsilon_{(1)}, \ldots, u_{(N_i^{ac}-M)} - \varepsilon_{(N_i^{ac}-M)}] \quad (29)$$

By use of the matrix X defined by the above formula (23) and the matrix $U^{better}$ defined by the above formula (24), the above formula (29) is defined by the following formula (30).

$$F_{new}^{ideal} X = U^{better} \quad (30)$$

There may be a case where the ideal feedback coefficient matrix $F_{new}^{ideal}$ which satisfies the above formula (30) does not exist.

However, among the feedback coefficient matrices $F_{new}$ which minimize the square of the error by the Frobenius norm $\|\cdot\|_F$ defined by the following formula (31), there is one feedback coefficient matrix $F_{new}$ which minimizes $\|F_{new}\|_F$. The feedback coefficient matrix $F_{new}$ which minimizes $\|F_{new}\|_F$ may be calculated by the following calculated g formula (32). The feedback coefficient matrix $F_{new}$ is defined by the following formula (33).

$$\|F_{new} X - U^{better}\|_F^2 \quad (31)$$

$$U^{better} X^\dagger [u^{(1)}, \ldots, u^{(M)}, u_{(1)} - \varepsilon_{(1)}, \ldots, u_{(N_i^{ac}-M)} - u\varepsilon_{(N_i^{ac}-M)}][x^{(1)}, \ldots, x^{(M)}, x_{(1)}, \ldots, x_{(N_i^{ac}-M)}]^\dagger \quad (32)$$

$$F_{new} \in \mathbb{R}^{m \times n} \quad (33)$$

From the above, according to $U^{better} X^\dagger$, it is determined that it is possible to calculate the feedback coefficient matrix $F_{new}$ which is relatively close to the ideal feedback coefficient matrix $F_{new}^{ideal}$. Therefore, it is determined that use of $U_{better} X^\dagger$ makes it possible to update the feedback coefficient matrix F so as to approach the ideal feedback coefficient matrix $F_{new}^{ideal}$.

The update formula represented by the above formula (25) is a formula for updating the feedback coefficient matrix F by weighting the feedback coefficient matrix F before update and $U_{better} X^\dagger$ enabling the calculation of the feedback coefficient matrix $F_{new}$. For this reason, the update formula represented by the above formula (25) makes it possible to update the feedback coefficient matrix F so as to approach the ideal feedback coefficient matrix $F_{new}^{ideal}$. It is possible to derive the update formula represented by the above formula (25) based on the policy being linear in both the state $x_t$ and the feedback coefficient matrix F.

The above example has provided a description on the case where the policy improvement device 100 updates the feedback coefficient matrix F in a batch processing format, but the embodiment is not limited thereto. For example, the policy improvement device 100 may update the feedback coefficient matrix F in a sequential processing format.

In this case, the policy improvement device 100 proceeds to the process of (6-16') every time the processes of (6-11) to (6-14) are each executed once.

(6-16') When the TD error $\delta_t < 0$, the policy improvement device 100 updates the feedback coefficient matrix F. The policy improvement device 100 updates the feedback coefficient matrix F with the update formula represented by the following formula (34) based on the state $x_t$ and the input $u_t$, for example. The value β is a weight. There may be a case where β=1. The symbol † indicates the Moore-Penrose generalized inverse matrix.

$$F \leftarrow (1-\beta)F + \beta u_t x_t^\dagger \quad (34)$$

The policy improvement device 100 then proceeds to the process of (6-17').

On the other hand, when the TD error $\delta_t \geq 0$, the policy improvement device 100 does not update the feedback coefficient matrix F, and proceeds to the process of (6-17').

(6-17') The policy improvement device 100 estimates the parameter $\theta_F$ of the estimated state value function defined by the following formula (35). The value α is a weight. After that, the policy improvement device 100 returns to the process of (6-11).

$$\theta_F \leftarrow \theta_F + \alpha \delta \nabla \hat{v}(x_t; \delta_F) \quad (35)$$

As a result, the policy improvement device 100 does not have to estimate the gradient function matrix of the state value function v(•; F), and thus may update the feedback coefficient matrix F while reducing the number of input decisions regardless of the size of the feedback coefficient matrix F. The policy improvement device 100 is then allowed to also reduce the number of processes for observing the immediate cost by waiting for a predetermined time according to the input decision. Therefore, it is possible for the policy improvement device 100 to reduce the processing load and processing time.

The policy improvement device 100 may update the feedback coefficient matrix F so that the cumulative cost is efficiently optimized, improving the policy efficiently. Even when it is not clear what perturbation term $\varepsilon_t$ is appropriate for the input or feedback coefficient matrix F, the policy improvement device 100 may update the feedback coefficient matrix F, improving the policy efficiently.

In the above example, description has been provided for the case where the immediate cost of the control target 110 is used in reinforcement learning, but the embodiment is not limited thereto. For example, there may be a case where the immediate reward of the control target 110 is used in reinforcement learning.

The above example has provided a description on the case where, when M>0, the policy improvement device 100 updates the feedback coefficient matrix F, but the embodiment is not limited thereto. For example, when M>threshold, there may be a case where the policy improvement device 100 updates the feedback coefficient matrix F.

The above example has provided a description on the case where the policy is linear in both the state $x_t$ and the feedback coefficient matrix F, but the embodiment is not limited thereto. For example, the policy improvement device 100 may be applied also when the policy is deterministic, linear in the feedback coefficient matrix F, and linear in the feature quantity calculated from the state $s_t$. The state $s_t$ is a more general state which in some cases does not take a continuous value like the state $x_t$.

For example, the policy improvement device 100 may be applied also when there is a state set S which is not limited to the n-dimensional real vector space, a function giving a feature quantity φ(s) on the n-dimensional real vector space for each state s∈S is defined by the following formula (36), and the policy is defined by the following formula (37). In this case, the policy improvement device 100 may use the feature quantity $\varphi(s_t)$ instead of the state $x_t$.

$$\varphi: S \to \mathbb{R}^n \quad (36)$$

$$u_t = F\Pi(s_t) \quad (37)$$

The above example has provided a description on the case where the policy improvement device 100 calculates the input $u_t$ including the perturbation term $\varepsilon_t$ with the above formula (16), but the embodiment is not limited thereto. For example, there may be a case where the policy improvement device 100 calculates the input $u_t$ by adding the perturbation matrix $\Delta_t$ to the feedback coefficient matrix F with the following formula (38). The perturbation matrix $\Delta_t$ is defined by the following formula (39).

$$u_t = (F + \Delta_t) x_t \quad (38)$$

$$\Delta_t \in \mathbb{R}^{m \times n} \quad (39)$$

The above example has provided a description on the case where the policy improvement device 100 uses the Moore-Penrose generalized inverse matrix as the generalized inverse matrix regarding the state, but the embodiment is not limited thereto. For example, there may be a case where the policy improvement device 100 uses a generalized inverse matrix in a different form as the generalized inverse matrix regarding the state. For different forms of generalized inverse matrix, it is possible to refer to Reference Documents 6, 7, and 8 below.

Reference Document 6: Ben-Israel, Adi, and Thomas N E Greville. Generalized inverses: theory and applications. Vol. 15. Springer Science & Business Media, 2003.

Reference Document 7: Yanai, Haruo, Kei Takeuchi, and Yoshio Takane. "Projection Matrices, Generalized Inverse Matrices, and Singular Value Decomposition". Springer, New York, NY, 2011.

Reference Document 8: Bernstein, Dennis S. Matrix mathematics: theory, facts, and formulas. Princeton university press, 2009.

(Example of Comparing Numbers of Input Decisions)

Next, an example is described with reference to FIG. 7 in which the numbers of input decisions of the policy improvement device 100 and a device other than the policy improvement device 100 are compared.

FIG. 7 is an explanatory diagram illustrating an example in which the numbers of input decisions are compared. The table 700 illustrated in FIG. 7 presents the results of comparing the first control method based on the above-mentioned Reference Document 1, the second control method (control method α) based on the above-mentioned Reference Documents 2 and 3, and the number of input decisions of the policy improvement device 100.

In the first control method, the policy is improved based on the state-action value function, the number of input decisions for policy evaluation is $N_e$, and the number of input decisions for policy update is 0, but there is a problem that it is difficult to update the policy unless the method of appropriately adding the perturbation term to the input is clear.

In the second control method, the policy is improved based on the state value function, the number of input decisions for policy evaluation is $N'_e$, and the number of input decisions for policy update is $mnN_i$, but there is a problem that the number of input decisions increases in proportion to the size mn of the feedback coefficient matrix F. Note that $N_e > N'_e$.

On the other hand, the policy improvement device 100 is a device which improves a policy based on a state value function in a batch processing format, and the number of input decisions for policy update may be $N_i^{ac}$ times assuming that the number of input decisions for policy evaluation is $N'_e$ times. Note that $N_i^{ac} < mnN_i$. As a result, the policy improvement device 100 may perform policy update based on the state value function, unlike the first control method. Unlike the second control method, the policy improvement device 100 may perform policy update while reducing the number of input decisions.

The policy improvement device 100 may set the number of input decisions for policy evaluation and policy update based on the state value function to one by the sequential processing format. As a result, the policy improvement device 100 may perform policy update based on the state value function, unlike the first control method. Unlike the second control method, the policy improvement device 100 may perform policy update while reducing the number of input decisions.

(Specific Example of Control Target 110)

Next, a specific example of the control target 110 is described with reference to FIGS. 8 to 10.

Figure 8:
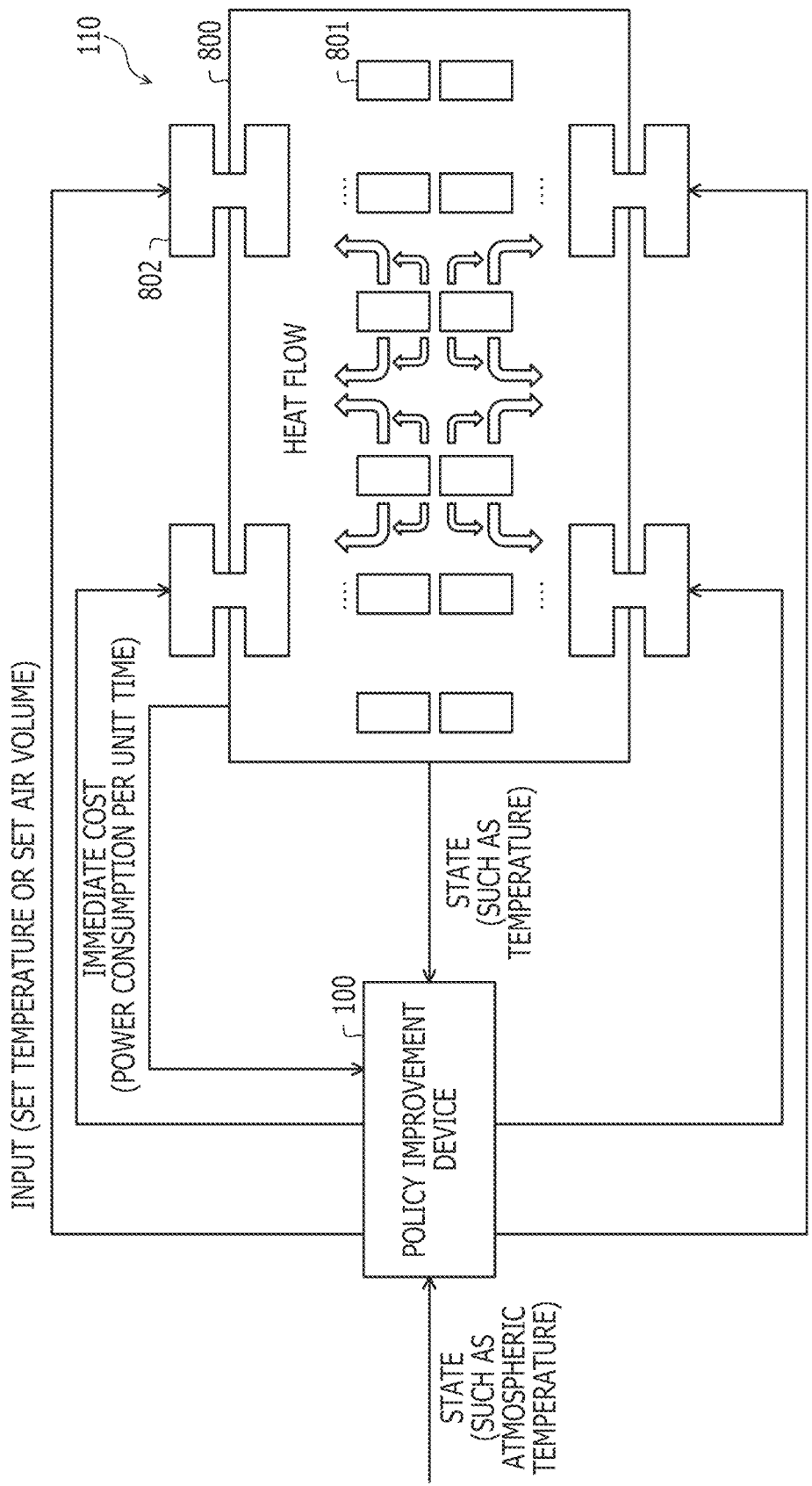
FIG. 8 is an explanatory diagram (#1) illustrating a specific example of a control target.
Figure 9:
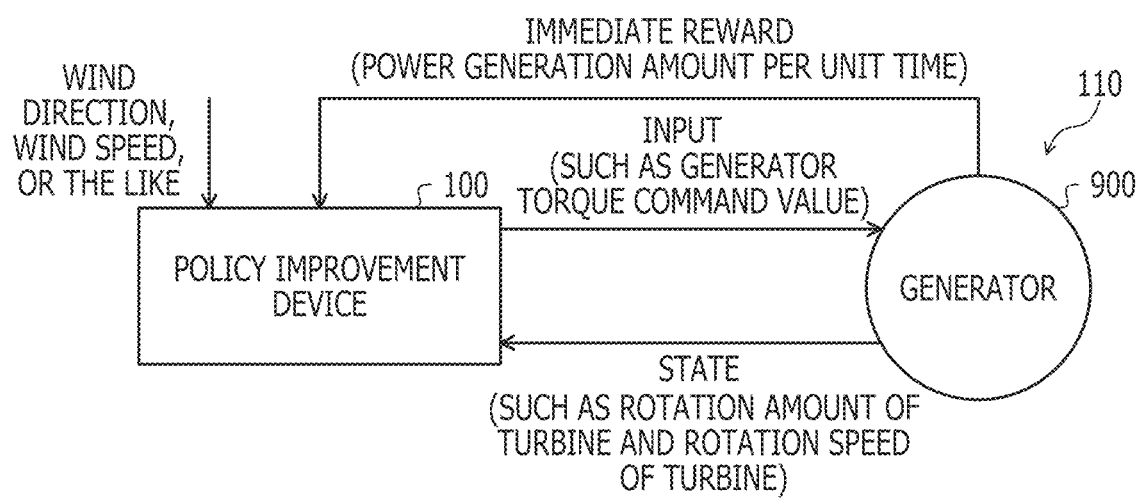
FIG. 9 is an explanatory diagram (#2) illustrating a specific example of the control target.
Figure 10:
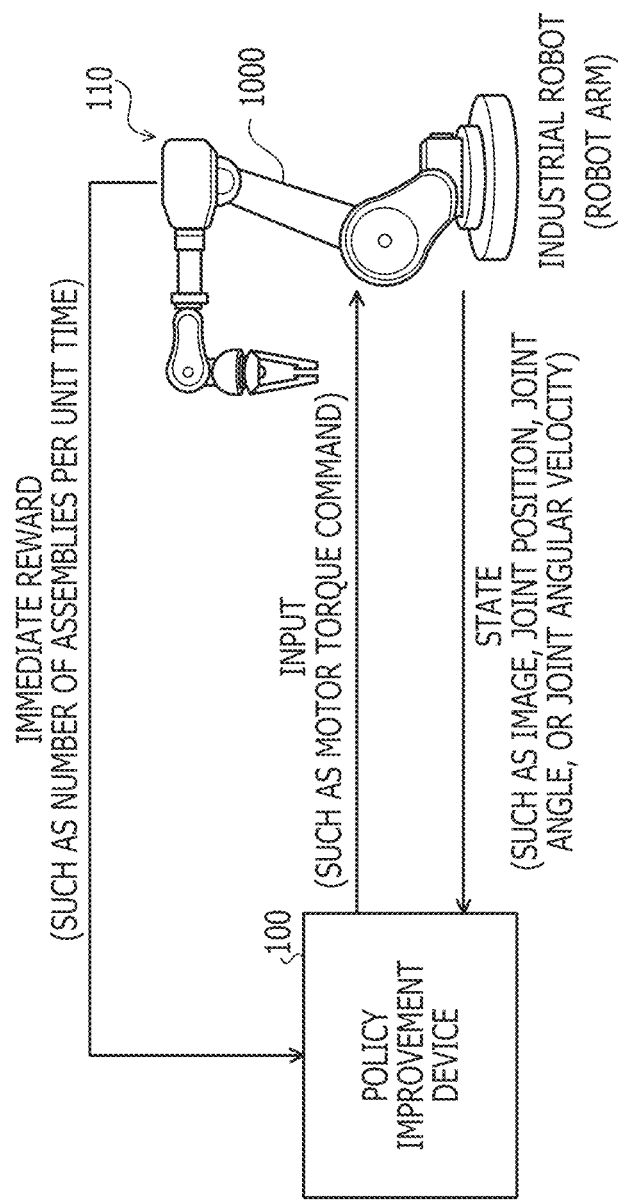
FIG. 10 is an explanatory diagram (#3) illustrating a specific example of the control target.

FIGS. 8 to 10 are explanatory diagrams illustrating specific examples of the control target 110. In the example of FIG. 8, the control target 110 is a server room 800 including a server 801 that is a heat source and a cooler 802, such as CRAC or Chiller. The input is a set temperature or a set air volume for the cooler 802. The state is sensor data from a sensor device provided in the server room 800, such as the temperature. The state may be data related to the control target 110 obtained from a target other than the control target 110, and may be, for example, temperature or weather. The immediate cost is, for example, the power consumption of the server room 800 per unit time. The unit time is, for example, five minutes. The target is to minimize the accumulated power consumption of the server room 800. The state value function represents, for example, the state value of the accumulated power consumption of the server room 800.

The policy improvement device 100 may update the feedback coefficient matrix F so that the accumulated power consumption, which is the cumulative cost, is efficiently minimized. The policy improvement device 100 may reduce the number of input decisions for updating the feedback coefficient matrix F. Therefore, the policy improvement device 100 is capable of reducing the time taken until the accumulated power consumption of the control target 110 is minimized, and reducing the operating cost of the server room 800. Even in a case where a change in the use status of the server 801, a change in temperature, or the like occurs, the policy improvement device 100 is capable of efficiently minimizing the accumulated power consumption in a relatively short period of time from the change.

A description has been provided for the case where the immediate cost is the power consumption per unit time of the server room 800, but the embodiment is not limited thereto. The immediate cost may be, for example, the sum of squares of the error between the target room temperature of the server room 800 and the current room temperature. The target may be, for example, to minimize the accumulated value of the sum of squares of the error between the target room temperature of the server room 800 and the current room temperature. The state value function represents, for example, the state value regarding the error between the target room temperature and the current room temperature.

In the example of FIG. 9, the control target 110 is a generator 900. The generator 900 is, for example, a wind generator. The input is a command value for the generator 900. The command value is, for example, a generator torque. The state is sensor data from the sensor device provided in the generator 900, and is, for example, the power generation amount of the power generator 900, the rotation amount or rotation speed of the turbine of the generator 900, or the like. The state may be the wind direction or wind speed with respect to the generator 900. The immediate reward is, for example, the power generation amount of the generator 900 per unit time. The unit time is, for example, five minutes. The target is, for example, to maximize the accumulated power generation amount of the power generator 900. The state value function represents, for example, the state value of the accumulated power generation amount of the generator 900.

The policy improvement device 100 may update the feedback coefficient matrix F so that the accumulated power generation amount, which is the cumulative reward, is efficiently maximized. The policy improvement device 100 may reduce the number of input decisions for updating the feedback coefficient matrix F. Therefore, the policy improvement device 100 is capable of reducing the time taken until the accumulated power generation amount of the control target 110 is maximized, and increasing the profit of the generator 900. Even in a case where a change in the status of the generator 900 or the like occurs, the policy improvement device 100 is capable of efficiently maximizing the accumulated power generation amount in a relatively short period of time from the change.

In the example of FIG. 10, the control target 110 is the industrial robot 1000. The industrial robot 1000 is, for example, a robot arm. The input is a command value for the industrial robot 1000. The command value is, for example, the motor torque of the industrial robot 1000. The state is sensor data from a sensor device provided in the industrial robot 1000, and is, for example, an image taken by the industrial robot 1000, a joint position, a joint angle, a joint angular velocity, or the like of the industrial robot 1000. The immediate reward is, for example, the number of assemblies of the industrial robot 1000 per unit time. The target is to maximize the productivity of the industrial robot 1000. The state value function represents, for example, the state value of the accumulated number of assemblies of the industrial robot 1000.

The policy improvement device 100 may update the feedback coefficient matrix F so that the accumulated number of assemblies, which is the cumulative reward, is efficiently maximized. The policy improvement device 100 may reduce the number of input decisions for updating the feedback coefficient matrix F. Therefore, the policy improvement device 100 is capable of reducing the time taken until the accumulated number of assemblies of the control target 110 is maximized, and increasing the profit of the industrial robot 1000. Even in a case where a change in the status of the industrial robot 1000 or the like occurs, the policy improvement device 100 is capable of efficiently maximizing the accumulated number of assemblies in a relatively short period of time from the change.

The control target 110 may be the simulator of the specific example described above. The control target 110 may be a power generation apparatus other than wind power generation. The control target 110 may be, for example, a chemical plant. The control target 110 may be, for example, an autonomous mobile body. The autonomous mobile body is, for example, a drone, a helicopter, an autonomous mobile robot, an automobile, or the like. The control target 110 may be a game.

(Batch Processing Format Reinforcement Learning Processing Procedure)

Next, an example of a batch processing format reinforcement learning processing procedure executed by the policy improvement device 100 is described with reference to FIG. 11. The batch processing format reinforcement learning processing is realized by, for example, the CPU 201, the storage region, such as the memory 202 and the recording medium 205, and the network I/F 203 which are illustrated in FIG. 2.

Figure 11:
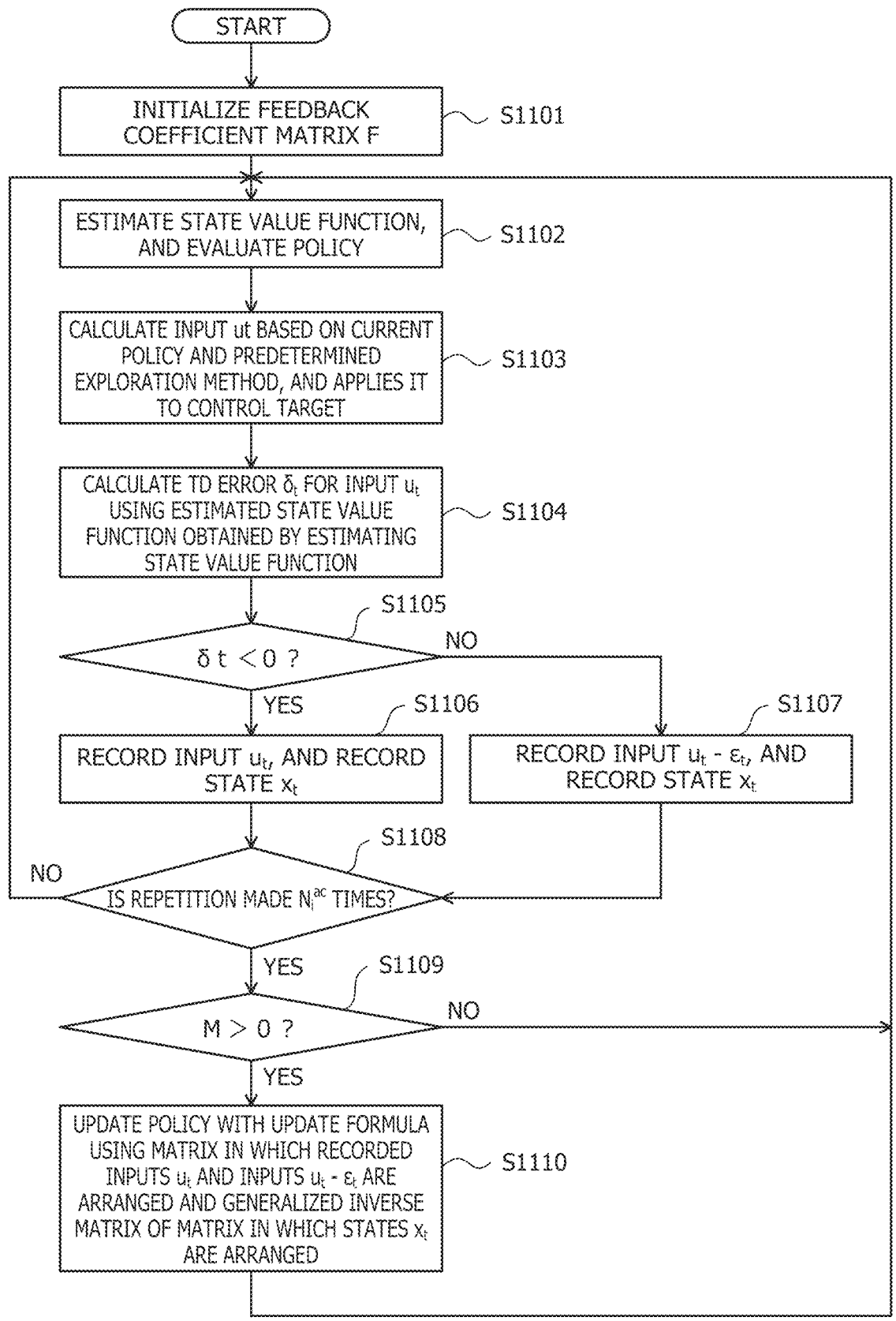
FIG. 11 is a flowchart illustrating an example of a batch processing format reinforcement learning processing procedure.

FIG. 11 is a flowchart illustrating an example of a batch processing format reinforcement learning processing procedure. The policy improvement device 100 starts the batch processing format reinforcement learning processing when a predetermined operation input by the user is received, for example.

In FIG. 11, the policy improvement device 100 initializes the feedback coefficient matrix F (step S1101). The policy improvement device 100 then proceeds to the process of step S1102.

In step S1102, the policy improvement device 100 estimates the state value function and evaluates the policy (step S1102). Next, the policy improvement device 100 calculates an input $u_t$ based on the current policy and a predetermined exploration method, and applies it to the control target 110 (step S1103). The policy improvement device 100 then calculates the TD error $\delta_t$ for the input $u_t$ using the estimated state value function obtained by estimating the state value function (step S1104).

Next, the policy improvement device 100 determines whether or not the TD error $\delta_t<0$ (step S1105). When the TD error $\delta_t<0$ (step S1105: Yes), the policy improvement device 100 proceeds to the process of step S1106. On the other hand, when the TD error $\delta_t \geq 0$ (step S1105: No), the policy improvement device 100 proceeds to the process of step S1107.

In step S1106, the policy improvement device 100 records the input $u_t$ and records the state $x_t$ (step S1106). The policy improvement device 100 then proceeds to the process of step S1108.

In step S1107, the policy improvement device 100 records the input $u_t - \varepsilon_t$ and the state $x_t$ (step S1107). The policy improvement device 100 then proceeds to the process of step S1108.

In step S1108, the policy improvement device 100 determines whether or not the processes of steps S1102 to S1107 have been repeated $N_i^{ac}$ times (step S1108). When repetition is not made $N_i^{ac}$ times (step S1108: No), the policy improvement device 100 returns to the process of step S1102. On the other hand, when repetition is made $N_i^{ac}$ times (step S1108: Yes), the policy improvement device 100 proceeds to the process of step S1109.

In step S1109, the policy improvement device 100 determines whether or not the number of times in the $N_i^{ac}$ times the TD error satisfied $\delta_t<0$ satisfies M>0 (step S1109). When the number of times M=0 (step S1109: No), the policy improvement device 100 returns to the process of step S1102. On the other hand, when the number of times M>0 (step S1109: Yes), the policy improvement device 100 proceeds to the process of step S1110.

In step S1110, the policy improvement device 100 updates the policy with an update formula using a matrix in which the recorded inputs $u_t$ and inputs $u_t-\varepsilon_t$ are arranged and a generalized inverse matrix of the matrix in which the states $x_t$ are arranged (step S1110). The policy improvement device 100 then returns to the process of step S1102.

The policy improvement device 100 ends the batch processing format reinforcement learning processing, for example, when the policy is updated a predetermined number of times, when the difference in policy before and after the update is a certain value or less, when a predetermined operation input by the user is received, or the like. Accordingly, the policy improvement device 100 is capable of controlling the control target 110.

(Sequential Processing Format Reinforcement Learning Processing Procedure)

Next, an example of a sequential processing format reinforcement learning processing procedure executed by the policy improvement device 100 is described with reference to FIG. 12. The sequential processing format reinforcement learning processing is realized by, for example, the CPU 201, the storage region, such as the memory 202 and the recording medium 205, and the network I/F 203 which are illustrated in FIG. 2.

Figure 12:
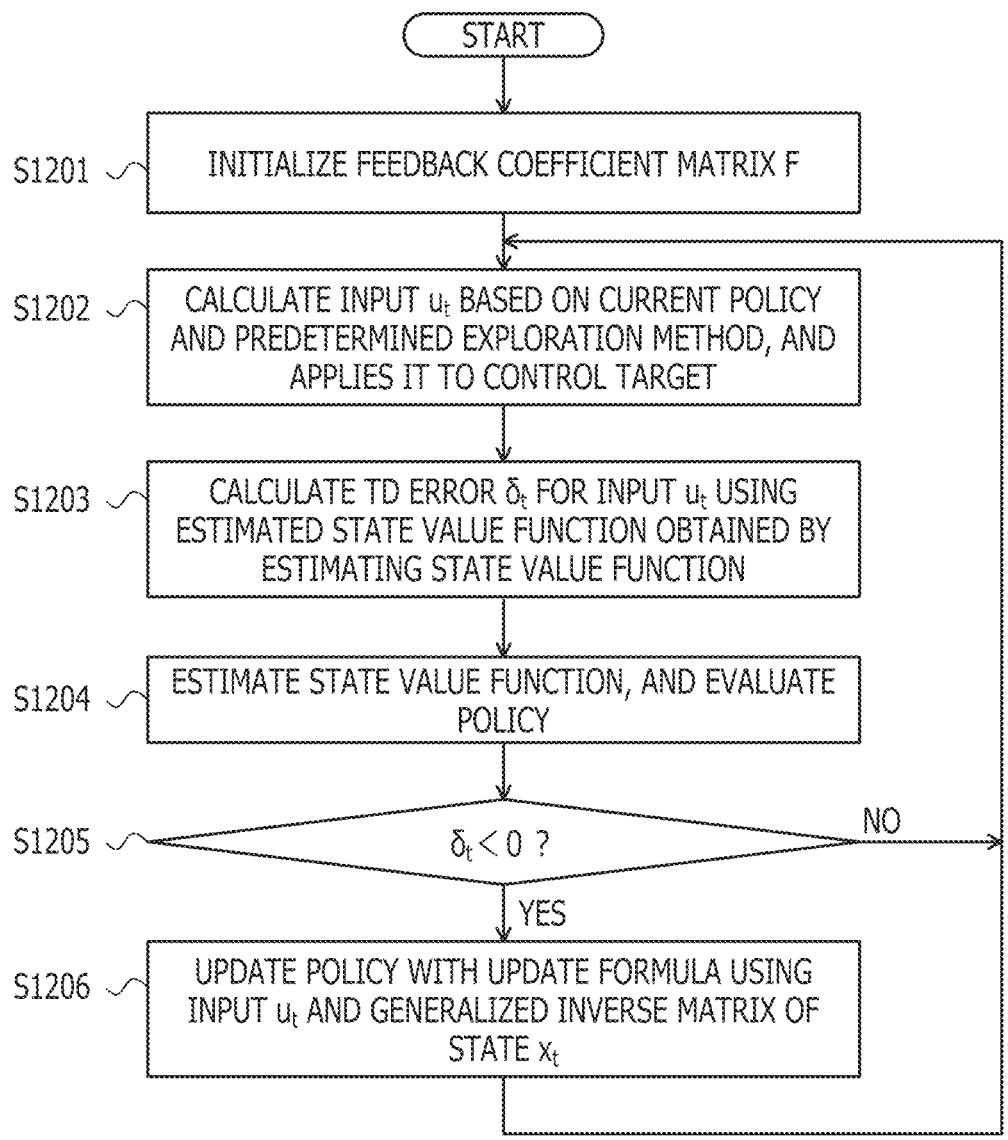
FIG. 12 is a flowchart illustrating an example of a sequential processing format reinforcement learning processing procedure.

FIG. 12 is a flowchart illustrating an example of a sequential processing format reinforcement learning processing procedure. The policy improvement device 100 starts the sequential processing format reinforcement learning processing when a predetermined operation input by the user is received, for example.

In FIG. 12, the policy improvement device 100 initializes the feedback coefficient matrix F (step S1201). The policy improvement device 100 then proceeds to the process of step S1202.

In step S1202, the policy improvement device 100 calculates an input $u_t$ based on the current policy and a predetermined exploration method, and applies it to the control target 110 (step S1202). Next, the policy improvement device 100 calculates the TD error $\delta_t$ for the input $u_t$ using the estimated state value function obtained by estimating the state value function (step S1203). The policy improvement device 100 then estimates the state value function and evaluates the policy (step S1204).

Next, the policy improvement device 100 determines whether or not the TD error $\delta_t<0$ (step S1205). When the TD error $\delta_t<0$ (step S1205: Yes), the policy improvement device 100 proceeds to the process of step S1206. On the other hand, when the TD error $\delta_t \geq 0$ (step S1205: No), the policy improvement device 100 returns to the process of step S1202.

In step S1206, the policy improvement device 100 updates the policy with the update formula using the input $u_t$ and the generalized inverse matrix regarding the state $x_t$ (step S1206). The policy improvement device 100 then returns to the process of step S1202.

The policy improvement device 100 ends the sequential processing format reinforcement learning processing when the policy is updated a predetermined number of times, when the difference in policy before and after the update is a certain value or less, when a predetermined operation input by the user is received, or the like. Accordingly, the policy improvement device 100 is capable of controlling the control target 110.

As described above, the policy improvement device 100 makes it possible to calculate an input to the control target 110 based on the policy and a predetermined exploration method of exploring for the input to the control target 110 in reinforcement learning. Based on the result of applying the calculated input to the control target 110, the policy improvement device 100 makes it possible to use the input to the control target 110 and the generalized inverse matrix for the state of the control target 110 to update the policy parameter. As a result, the policy improvement device 100 is allowed to reduce the number of input decisions for updating the policy parameter, regardless of the number of policy parameter components.

The policy improvement device 100 makes it possible to calculate the input to the control target 110 based on the policy and the exploration method. The policy improvement device 100 makes it possible to determine whether or not to use the input to update the policy parameter based on the result of applying the calculated input to the control target 110. When it is determined that the input is used, the policy improvement device 100 makes it possible to update the policy parameter using the input and the generalized inverse matrix for the state of the control target 110 when the input is calculated. As a result, the policy improvement device 100 may perform reinforcement learning in a sequential processing format.

The policy improvement device 100 makes it possible to calculate the input to the control target 110 based on the policy and the exploration method. The policy improvement device 100 makes it possible to determine whether or not to use the calculated input to update the policy parameter based on the result of applying the calculated input to the control target 110. According to the policy improvement device 100, it is possible to record the calculated input when it is determined that the calculated input is used, and it is possible to record a different input to the control target 110 calculated from the policy when it is determined that the calculated input is not used. The policy improvement device 100 makes it possible to record the state of the control target 110 when the input is calculated. The policy improvement device 100 makes it possible to update the policy parameter using the inputs to the control target 110 recorded multiple times and the generalized inverse matrix for the states of the control target 110 recorded multiple times. As a result, the policy improvement device 100 may perform reinforcement learning in a batch processing format.

The policy improvement device 100 makes it possible to estimate the state value function and to calculate the TD error based on the result of applying the calculated input to the control target 110 and the result of estimating the state value function. The policy improvement device 100 makes it possible to determine whether or not to use the input based on the calculated TD error. This makes it possible for the policy improvement device 100 to accurately determine whether or not to use the input based on the TD error.

The policy improvement device 100 makes it possible to estimate the state value function and to calculate the TD error based on the result of applying the calculated input to the control target 110 and the result of estimating the state value function. According to the policy improvement device 100, based on the calculated TD error, it is possible to determine that the input is used when it is determined that a preferable effect is obtained with the input, and it is possible to determine that the input is not used when it is determined that a preferable effect is not obtained with the input. The policy improvement device 100 makes it possible to update the policy parameter so that there appears a tendency to output the input determined to have obtained a preferable effect and not to output the input determined to not have obtained a preferable effect. As a result, the policy improvement device 100 may update the policy parameter so as to output the input determined to have obtained a preferable effect, improving the policy efficiently.

The policy improvement device 100 makes it possible to update the policy parameter using an update formula represented by a matrix formed by arranging inputs recorded multiple times and a generalized inverse matrix of a matrix formed by arranging states recorded multiple times. As a result, the policy improvement device 100 may accurately update the policy parameter so as to output the input determined to have obtained a preferable effect.

The policy improvement device 100 makes it possible to calculate the input to the control target 110 based on the policy and the exploration method in which a perturbation is added to the input calculated from the policy. As a result, the policy improvement device 100 searches whether or not there is a more appropriate input than the input determined to be currently optimal, and thus is allowed to apply an input other than the input determined to be currently optimal to the control target 110.

The policy improvement device 100 makes it possible to calculate the input to the control target 110 based on the policy and the exploration method in which a perturbation is added to the policy parameter. As a result, the policy improvement device 100 searches whether or not there is a more appropriate input than the input determined to be currently optimal, and thus is allowed to apply an input other than the input determined to be currently optimal to the control target 110.

The policy improvement device 100 makes it possible to calculate the input to the control target 110 based on the policy and the ε-greedy method. As a result, the policy improvement device 100 searches whether or not there is a more appropriate input than the input determined to be currently optimal, and thus is allowed to apply an input other than the input determined to be currently optimal to the control target 110.

The policy improvement device 100 makes it possible to estimate the state value function using any of the batch least-squares method, the recursive least-squares method, the batch LSTD algorithm, and the recursive LSTD algorithm. As a result, the policy improvement device 100 is capable of accurately estimating the state value function.

The policy improvement device 100 makes it possible to use a policy that is deterministic, is a control law which calculates an input taking a continuous value, and is linear with respect to the policy parameter. As a result, the policy improvement device 100 may use a policy which facilitates deriving an update formula for updating the parameter.

The policy improvement device 100 makes it possible to use as the input at least any of a set temperature of the air conditioning apparatus and a set air volume of the air conditioning apparatus. The policy improvement device 100 makes it possible to use as the state at least any of the temperature inside a room with the air conditioning apparatus, the temperature outside the room with the air conditioning apparatus, and the climate. The policy improvement device 100 makes it possible to use as the cost the power consumption of the air conditioning apparatus. As a result, the policy improvement device 100 may be applied when the control target 110 is an air conditioning apparatus.

The policy improvement device 100 makes it possible to use as the input the generator torque of the power generation apparatus. The policy improvement device 100 makes it possible to use as the state at least any of the power generation amount of the power generation apparatus, the rotation amount of the turbine of the power generation apparatus, the rotation speed of the turbine of the power generation apparatus, the wind direction with respect to the power generation apparatus, and the wind speed with respect to the power generation apparatus. The policy improvement device 100 makes it possible to use as the reward the power generation amount of the power generation apparatus. As a result, the policy improvement device 100 may be applied when the control target 110 is a power generation apparatus.

The policy improvement device 100 makes it possible to use as the input the motor torque of the industrial robot. The policy improvement device 100 makes it possible to use as the state at least any of an image taken by the industrial robot, a joint position of the industrial robot, a joint angle of the industrial robot, and a joint angular velocity of the industrial robot. The policy improvement device 100 makes it possible to use as the reward the production amount of the industrial robot. As a result, the policy improvement device 100 may be applied when the control target 110 is an industrial robot.

The policy improvement method described in this embodiment may be realized by executing a program prepared in advance on a computer such as a personal computer or a workstation. The policy improvement program described according to the present embodiment is recorded on a computer-readable recording medium such as a hard disk, a flexible disk, a compact disc (CD)-ROM, a magneto-optical (MO) disc, or a digital versatile disc (DVD) and is executed as a result of being read from the recording medium by the computer. The policy improvement program described according to the present embodiment may be distributed through a network such as the Internet.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A policy improvement method of improving a policy of reinforcement learning based on a state value function, the policy improvement method causing a computer to execute a process comprising:

calculating an input to a control target based on the policy and a predetermined exploration method of exploring for an input to the control target in the reinforcement learning; and updating a parameter of the policy based on a result of applying the calculated input to the control target, using the input to the control target and a generalized inverse matrix regarding a state of the control target, wherein the computer executes the process multiple times including:

calculating the input to the control target based on the policy and the exploration method;

estimating the state value function;

calculating a TD (Temporal Difference) error based on the result of applying the calculated input to the control target and a result of estimating the state value; and determining whether or not to use the input to update the parameter of the policy based on the result of applying the calculated input to the control target including, based on the calculated TD error, determining to use the input if it is determined that a preferable effect has been obtained with the input, and determining not to use the input if it is determined that a preferable effect is not obtained with the input, based on the calculated TD error, if it is determined that the input is used, recording the input;

if it is determined that the input is not used, recording a different input to the control target calculated from the policy; and recording the state of the control target when the input is calculated; and wherein in updating, updates the parameter of the policy using inputs to the control target recorded multiple times and a generalized inverse matrix regarding states of the control target recorded multiple times so that there appears a tendency to output an input to the control target determined to have obtained a preferable effect and not to output an input to the control target determined to not have obtained a preferable effect.

2. The policy improvement method according to claim 1, wherein in the updating, determining whether or not to use the input to update the parameter of the policy based on the result of applying the calculated input to the control target, and if it is determined that the input is used, updating the parameter of the policy using the input and the generalized inverse matrix regarding the state of the control target when the input is calculated.

3. The policy improvement method according to claim 1, wherein updating updates the parameter of the policy using an update formula represented by a matrix formed by arranging the inputs to the control target recorded multiple times and the generalized inverse matrix of a matrix formed by arranging the states of the control target recorded multiple times.

4. The policy improvement method according to claim 1, wherein calculating calculates the input to the control target based on the policy and an exploration method in which a perturbation is added to the input calculated from the policy.

5. The policy improvement method according to claim 1, wherein calculating calculates the input to the control target based on the policy and an exploration method in which a perturbation is added to the parameter of the policy.

6. The policy improvement method according to claim 1, wherein calculating calculates the input to the control target based on the policy and an ε-greedy method.

7. The policy improvement method according to claim 1, wherein estimating estimates the state value function using any of a batch least-squares method, a recursive least-squares method, a batch LSTD (Least Squares Temporal Difference) algorithm, and a recursive LSTD algorithm.

8. The policy improvement method according to claim 1, wherein the policy is deterministic, is a control law which calculates an input taking a continuous value, and is linear with respect to the parameter of the policy.

9. The policy improvement method according to claim 1, wherein the control target is an air conditioning apparatus, and reinforcement learning defines an input as at least any of a set temperature of the air conditioning apparatus and a set air volume of the air conditioning apparatus, defines a state as at least any of a temperature inside a room with the air conditioning apparatus, a temperature outside the room with the air conditioning apparatus, and a weather, and defines a cost as power consumption of the air conditioning apparatus.

10. The policy improvement method according to claim 1, wherein the control target is a power generation apparatus, and reinforcement learning defines an input as a generator torque of the power generation apparatus, defines a state as at least any of a power generation amount of the power generation apparatus, a rotation amount of a turbine of the power generation apparatus, a rotation speed of the turbine of the power generation apparatus, a wind direction with respect to the power generation apparatus, and a wind speed with respect to the power generation apparatus, and defines a reward as the power generation amount of the power generation apparatus.

11. The policy improvement method according to claim 1, wherein the control target is an industrial robot, and reinforcement learning defines an input as a motor torque of the industrial robot, defines a state as at least any of an image taken by the industrial robot, a joint position of the industrial robot, a joint angle of the industrial robot, and a joint angular velocity of the industrial robot, and defines a reward as a production amount of the industrial robot.

12. A non-transitory computer-readable storage medium having stored a policy improvement program, for improving a policy of reinforcement learning based on a state value function, causing a computer to execute a process comprising:

calculating an input to a control target based on the policy and a predetermined exploration method of exploring for an input to the control target in the reinforcement learning;

updating a parameter of the policy based on a result of applying the calculated input to the control target, using the input to the control target and a generalized inverse matrix regarding a state of the control target, executing the process multiple times, the process including:

calculating the input to the control target based on the policy and the exploration method;

estimating the state value function;

calculating a TD (Temporal Difference) error based on the result of applying the calculated input to the control target and a result of estimating the state value; and determining whether or not to use the input to update the parameter of the policy based on the result of applying the calculated input to the control target including, based on the calculated TD error, determining to use the input if it is determined that a preferable effect has been obtained with the input, and determining not to use the input if it is determined that a preferable effect is not obtained with the input, based on the calculated TD error, if it is determined that the input is used, recording the input;

if it is determined that the input is not used, recording a different input to the control target calculated from the policy; and recording the state of the control target when the input is calculated; and wherein in updating, updating the parameter of the policy using inputs to the control target recorded multiple times and a generalized inverse matrix regarding states of the control target recorded multiple times so that there appears a tendency to output an input to the control target determined to have obtained a preferable effect and not to output an input to the control target determined to not have obtained a preferable effect.

13. The non-transitory computer-readable storage medium according to claim 12, wherein updating updates the parameter of the policy using an update formula represented by a matrix formed by arranging the inputs to the control target recorded multiple times and the generalized inverse matrix of a matrix formed by arranging the states of the control target recorded multiple times.

14. A policy improvement device for improving a policy of reinforcement learning based on a state value function, the device comprising:

a memory including computer program code, and a processor coupled to the memory and configured to execute the computer program code comprising:

calculating an input to a control target based on the policy and a predetermined exploration method of exploring for an input to the control target in the reinforcement learning; and updating a parameter of the policy based on a result of applying the calculated input to the control target, using the input to the control target and a generalized inverse matrix regarding a state of the control target, wherein the processor executes the computer program code multiple times including:

calculating the input to the control target based on the policy and the exploration method;

estimating the state value function;

calculating a TD (Temporal Difference) error based on the result of applying the calculated input to the control target and a result of estimating the state value; and determining whether or not to use the input to update the parameter of the policy based on the result of applying the calculated input to the control target including, based on the calculated TD error, determining to use the input if it is determined that a preferable effect has been obtained with the input, and determining not to use the input if it is determined that a preferable effect is not obtained with the input, based on the calculated TD error, if it is determined that the input is used, recording the input;

if it is determined that the input is not used, recording a different input to the control target calculated from the policy; and recording the state of the control target when the input is calculated; and wherein updating updates the parameter of the policy using inputs to the control target recorded multiple times and a generalized inverse matrix regarding states of the control target recorded multiple times so that there appears a tendency to output an input to the control target determined to have obtained a preferable effect and not to output an input to the control target determined to not have obtained a preferable effect.

15. The policy improvement device according to claim 14, wherein updating updates the parameter of the policy using an update formula represented by a matrix formed by arranging the inputs to the control target recorded multiple times and the generalized inverse matrix of a matrix formed by arranging the states of the control target recorded multiple times.

16. The policy improvement device according to claim 14, wherein the control target is an air conditioning apparatus, and reinforcement learning defines an input as at least any of a set temperature of the air conditioning apparatus and a set air volume of the air conditioning apparatus, defines a state as at least any of a temperature inside a room with the air conditioning apparatus, a temperature outside the room with the air conditioning apparatus, and a weather, and defines a cost as power consumption of the air conditioning apparatus.

17. The policy improvement device according to claim 14, wherein the control target is a power generation apparatus, and reinforcement learning defines an input as a generator torque of the power generation apparatus, defines a state as at least any of a power generation amount of the power generation apparatus, a rotation amount of a turbine of the power generation apparatus, a rotation speed of the turbine of the power generation apparatus, a wind direction with respect to the power generation apparatus, and a wind speed with respect to the power generation apparatus, and defines a reward as the power generation amount of the power generation apparatus.

18. The policy improvement device according to claim 14, wherein the control target is an industrial robot, and reinforcement learning defines an input as a motor torque of the industrial robot, defines a state as at least any of an image taken by the industrial robot, a joint position of the industrial robot, a joint angle of the industrial robot, and a joint angular velocity of the industrial robot, and defines a reward as a production amount of the industrial robot.

19. The policy improvement device according to claim 14, wherein calculating calculates the input to the control target based on the policy and an exploration method in which a perturbation is added to the input calculated from the policy.

20. The policy improvement device according to claim 14, wherein calculating calculates the input to the control target based on the policy and an exploration method in which a perturbation is added to the parameter of the policy.

* * * * *